US009585131B2

(12) United States Patent
Gao et al.

(10) Patent No.: US 9,585,131 B2
(45) Date of Patent: Feb. 28, 2017

(54) METHOD AND DEVICE FOR TRANSMITTING UPLINK CONTROL INFORMATION (UCI)

(71) Applicant: China Academy of Telecommunications Technology, Beijing (CN)

(72) Inventors: Xuejuan Gao, Beijing (CN); Yanan Lin, Beijing (CN); Qianqian Si, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 33 days.

(21) Appl. No.: 14/418,777

(22) PCT Filed: Aug. 2, 2013

(86) PCT No.: PCT/CN2013/080700
§ 371 (c)(1),
(2) Date: Jan. 30, 2015

(87) PCT Pub. No.: WO2014/019541
PCT Pub. Date: Feb. 6, 2014

(65) Prior Publication Data
US 2015/0173066 A1    Jun. 18, 2015

(30) Foreign Application Priority Data

Aug. 3, 2012  (CN) .......................... 2012 1 0276428

(51) Int. Cl.
*H04W 4/00*       (2009.01)
*H04W 72/04*      (2009.01)
(Continued)

(52) U.S. Cl.
CPC ........... *H04W 72/0413* (2013.01); *H04L 1/06* (2013.01); *H04L 1/1671* (2013.01); *H04L 5/0055* (2013.01); *H04L 5/001* (2013.01)

(58) Field of Classification Search
CPC ...... H04W 72/04; H04W 88/08; H04W 76/00
See application file for complete search history.

(56) References Cited

U.S. PATENT DOCUMENTS

2007/0149132 A1* 6/2007 Li ........................ H04W 24/10
                                                      455/67.11
2011/0269490 A1* 11/2011 Earnshaw ............. H04L 1/0026
                                                      455/509
(Continued)

FOREIGN PATENT DOCUMENTS

CN          102045144        5/2011
CN          102158326        8/2011
(Continued)

OTHER PUBLICATIONS

Ericsson, ST-Ericsson, 3GPP TSG-RAN WG1 Multi-cell periodic CSI transmission, May 21, 2012, R1-121986.*
(Continued)

*Primary Examiner* — Anez Ebrahim
*Assistant Examiner* — Siren Wei
(74) *Attorney, Agent, or Firm* — Foley & Lardner LLP; James F. Ewing; Paul M. H. Pua

(57) ABSTRACT

Disclosed are a method and device for transmitting uplink control information (UCI). By applying technical solutions of embodiments of the present invention, implemented is a method for simultaneously transmitting an ACK/NACK and cycle CSI on a channel resource corresponding to a current subframe: dynamically determining, on the basis of a threshold number of bits simultaneously transmitted with the UCI in the current subframe, also of the maximum number of feedback bits and of the minimum number of feedback bits (Continued)

of the ACK/NACK in the current subframe, ACK/NACK bits and CSI bits simultaneously transmitted in the current frame, thus ensuring that the sum of the bits simultaneously transmitted does not exceed the threshold number of bits simultaneously transmitted with the UCI in the current subframe, preventing as much as possible ACK/NACK merging and CSI discarding, and protecting to the maximum extent the accuracy and completeness of UCI transmission.

19 Claims, 6 Drawing Sheets

(51) Int. Cl.
*H04L 1/16* (2006.01)
*H04L 1/06* (2006.01)
*H04L 5/00* (2006.01)

(56) References Cited

U.S. PATENT DOCUMENTS

| | | | |
|---|---|---|---|
| 2012/0087254 A1* | 4/2012 | Yin | H04L 1/0031 370/252 |
| 2012/0099545 A1* | 4/2012 | Han | H04L 1/0028 370/329 |
| 2012/0140649 A1 | 6/2012 | Choudhury et al. | |
| 2012/0218948 A1* | 8/2012 | Onggosanusi | H04L 1/0031 370/329 |
| 2013/0258874 A1* | 10/2013 | Khoshnevis | H04L 5/0057 370/252 |

FOREIGN PATENT DOCUMENTS

| | | |
|---|---|---|
| CN | 102377535 | 3/2012 |
| CN | 102468936 | 5/2012 |
| WO | WO-2011/085230 A2 | 7/2011 |

OTHER PUBLICATIONS

Ericsson, ST-Ericsson, "Multi-cell periodic CSI transmission"; 3GPP TSG-RAN WG1 #69; R1-121986; Prague, Czech Republic, May 21-25, 2012.

Supplementary European Search Report for EP 13825262.2 mailed Jul. 21, 2015.

International Search Report for PCT/CN2013/080700 mailed Nov. 7, 2013.

\* cited by examiner

METHOD AND DEVICE FOR TRANSMITTING UPLINK CONTROL INFORMATION (UCI)

This application is a US National Stage of International Application No. PCT/CN2013/080700, filed on Aug. 2, 2013, designating the United States and claiming the priority of Chinese Patent Application No. 201210276428.X, filed with the Chinese Patent Office on Aug. 3, 2012, the content of which is hereby incorporated by reference in its entirety.

FIELD

The present invention relates to the field of communications and particularly to a method and device for transmitting Uplink Control Information (UCI).

BACKGROUND

There are significantly improved required peak rates in a Long Term Evolution-Advanced (LTE-A) system up to 1 Gbps in the downlink and 500 Mbps in the uplink as compared with the LTE system.

Thus the technology of Carrier Aggregation (CA) has been introduced so that a plurality of consecutive or inconsecutive carriers served by the same evolved Node B (eNB) are aggregated together to serve a User Equipment (UE) concurrently, and FIG. 1 illustrates a schematic diagram of an application scheme of the CA technology in the prior art.

These carriers aggregated together are also referred to as Component Carriers (CCs). In order to ensure compatibility with UEs in the LTE system, the bandwidth of each carrier is up to 20 MHz.

In another aspect, Uplink Control Information (UCI) will be described as follows:

The UCI includes Acknowledgement/Non-Acknowledgement (ACK/NACK) information, periodic Channel State Information (CSI) and Scheduling Request (SR) information.

The periodic CSI particularly includes Rank Indicator (RI) information, Channel Quality Indicator (CQI) information, Precoding Matrix Indicator (PMI) information and Precoder Type Indication (PTI) information.

In the LTE-A CA system, Physical Uplink Control Channel (PUCCH) format 3 is defined for transmission of multi-bit ACK/NACK information of a plurality of aggregated carriers. The maximum transmission capacity of the PUCCH format 3 is 22 bits and can support jointly encoded transmission of at most 20 bits of ACK/NACK and a 1-bit SR.

In the Rel-10 system, concurrent transmission of ACK/NACK information of a plurality of carriers and periodic CSI over a PUCCH is not supported, and if there are both ACK/NACK of a plurality of carriers and periodic CSI in a current subframe, then only the ACK/NACK is transmitted over the PUCCH whereas the CSI is dropped.

For a UE transmitting ACK/NACK using PUCCH format 3, only when support for concurrent transmission of ACK/NACK and CSI in a subframe is configured and a single downlink subframe is received only on a Primary Component Carrier (PCC), concurrent transmission of ACK/NACK of the received downlink subframe and periodic CSI of one carrier using PUCCH format 2/2a/2b is supported. If there are a plurality of carriers for which CSI needs to be fed back concurrently in a current subframe, then CSI of one carrier with high CSI reporting type priority is selected to be reported according to predefined CSI reporting type priorities, where the highest priority reporting types are the types 3, 5, 6 and 2a, the second highest priority reporting types are the types 2, 2b, 2c and 4, and the lowest priority reporting types are the types 1 and 1a, and CSI report contents and bits corresponding to each CSI reporting type in different reporting modes are as depicted in Table 1, and only one reporting type of each activated carrier of the UE is reported in one uplink subframe according to currently configured reporting types and a particular state. If there are a plurality of carriers with the same reporting type priority, then CSI of the carrier with the lowest index is further selected to be reported according to indexes of the carriers.

Table 1 depicts CSI report contents and bits corresponding to CSI reporting types in different reporting modes.

| | | | Reporting Modes | | | |
|---|---|---|---|---|---|---|
| Reporting Type | Report contents | Mode state | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 1a | Sub-band CQI/ second PMI | 8 antenna ports RI = 1 | NA | 8 + L | NA | NA |
| | | 8 antenna ports 1 < RI < 5 | NA | 9 + L | NA | NA |
| | | 8 antenna ports RI > 4 | NA | 7 + L | NA | NA |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| 2b | Wideband CQI/ second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| 2c | Wideband CQI/first PMI/ second PMI | 8 antenna ports RI = 1 | 8 | NA | NA | NA |
| | | 8 antenna ports 1 < RI ≤ 4 | 11 | NA | NA | NA |
| | | 8 antenna ports 4 < RI ≤ 7 | 9 | NA | NA | NA |
| | | 8 antenna ports RI = 8 | 7 | NA | NA | NA |
| 3 | RI | 2/4 antenna ports, 2-layer spatial multiplexing | 1 | 1 | 1 | 1 |
| | | 8 antenna ports, 2-layer spatial multiplexing | 1 | NA | NA | NA |

-continued

| Reporting Type | Report contents | Mode state | Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| | | 4 antenna ports, 4-layer spatial multiplexing | 2 | 2 | 2 | 2 |
| | | 8 antenna ports, 4-layer spatial multiplexing | 2 | NA | NA | NA |
| | | 8-layer spatial multiplexing | 3 | NA | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |

For Table 1, it shall be noted that:

The bits/BP represents a number of report bits per Bandwidth Part; the CQI/PMI is categorized as a wideband CQI/PMI and a sub-band CQI/PMI; the antenna ports represent antenna ports; the layer represents a transmission layer; the spatial multiplexing represents spatial multiplexing; the NA indicates that the reporting type is not supported in a corresponding reporting mode; and L represents label of a selected sub-band in at most 2 bits.

In the LTE-A Rel-11 CA system, enhanced transmission of UCI has been investigated, and in order to avoid an influence upon downlink scheduling of an eNB caused by excessively CSI dropping, concurrent transmission of ACK/NACK of multiple carriers and periodic CSI of one carrier using PUCCH format 3 is supported, and when there is an SR, concurrent transmission thereof with a 1-bit SR can be further supported.

SUMMARY

Embodiments of the invention provide a method and device for transmitting Uplink Control Information (UCI) so as to address such a problem in the prior art that particular transmission bits of ACK/ACK and CSI can not be determined accurately and consequently concurrent transmission of ACK/ACK and CSI can not be ensured without exceeding a maximum number of carrying bits.

In order to attain the object above, an embodiment of the invention in an aspect provides a method for transmitting Uplink Control Information (UCI), the method including at least the operations of:

determining, by a user equipment, a minimum number $B_{min}$ of feedback bits and/or a maximum number $B_{max}$ of feedback bits of Acknowledgement (ACK)/Non-Acknowledgement (NACK) in a current subframe;

selecting, by the user equipment, a downlink carrier and judging a relationship between a number C of feedback bits for judgment corresponding to a Channel State Information (CSI) reporting type of the downlink carrier, and a threshold number A of concurrently transmitted UCI bits in the current subframe and $B_{min}$ and/or $B_{max}$;

when a result of the judgment by the user equipment is $C>A-B_{min}$, generating, by the user equipment, $B_{max}$ bits of ACK/NACK feedback information and transmitting the generated ACK/NACK feedback information on a corresponding channel resource in the current subframe;

when the result of the judgment by the user equipment is $C \leq A-B_{max}$, generating, by the user equipment, $B_{max}$ bits of ACK/NACK feedback information and C bits of CSI feedback information and transmitting the generated ACK/NACK feedback information and CSI feedback information concurrently on a corresponding channel resource in the current subframe; and when the result of the judgment by the user equipment is other case, generating, by the user equipment, C bits of CSI feedback information, spatially bundling ACK/NACK feedback information of all or a part of downlink carriers with multi-codeword transmission, and transmitting the generated spatially-bundled ACK/NACK feedback information and CSI feedback information concurrently on a corresponding channel resource in the current subframe, wherein a number of bits of the spatially-bundled ACK/NACK feedback information does not exceed a value of A−C.

An embodiment of the invention in another aspect further provides a user equipment including:

a determining module configured to determine a minimum number $B_{min}$ of feedback bits and/or a maximum number $B_{max}$ of feedback bits of ACK/NACK in a current subframe;

a judging module configured to select a downlink carrier and to judge a relationship between a number C of feedback bits for judgment corresponding to a CSI reporting type of the downlink carrier, and a threshold number A of concurrently transmitted UCI bits in the current subframe and $B_{min}$ and/or $B_{max}$;

a processing module configured, when a result of the judgment by the judging module is $C>A-B_{min}$, to generate $B_{max}$ bits of ACK/NACK feedback information and to transmit the generated ACK/NACK feedback information on a corresponding channel resource in the current subframe;

when the result of the judgment by the judging module is $C \leq A-B_{max}$, to generate $B_{max}$ bits of ACK/NACK feedback information and C bits of CSI feedback information and to transmit the generated ACK/NACK feedback information and CSI feedback information concurrently on a corresponding channel resource in the current subframe; and when the result of the judgment by the judging module is other case, to generate C bits of CSI feedback information, to spatially bundle ACK/NACK feedback information of all or a part of downlink carriers with multi-codeword transmission and to transmit the generated spatially-bundled ACK/NACK feedback information and CSI feedback information concurrently on a corresponding channel resource in the current subframe, wherein a number of bits of the spatially-bundled ACK/NACK feedback information does not exceed a value of A−C.

An embodiment of the invention in another aspect further provides a method for transmitting Uplink Control Information (UCI), the method including at least the operations of:

determining, by a base station, a minimum number $B_{min}$ of feedback bits and/or a maximum number $B_{max}$ of feedback bits of ACK/NACK, fed back by a user equipment, in a current subframe;

selecting, by the base station, a downlink carrier and judging a relationship between a number C of feedback bits for judgment corresponding to a CSI reporting type of the downlink carrier, and a threshold number A of concurrently transmitted UCI bits in the current subframe and $B_{min}$ and/or $B_{max}$;

when a result of the judgment by the base station is $C>A-B_{min}$, determining, by the base station, that $B_{max}$ bits of ACK/NACK feedback information have been transmitted by the user equipment in the current subframe, and receiving the ACK/NACK feedback information transmitted by the user equipment on a corresponding channel resource in the current subframe according to the determined number of bits of feedback information;

when the result of the judgment by the base station is $C \leq A-B_{max}$, determining, by the base station, that $B_{max}$ bits of ACK/NACK feedback information and C bits of CSI feedback information have been transmitted by the user equipment in the current subframe, and receiving the ACK/NACK feedback information and the CSI feedback information transmitted by the user equipment concurrently on a corresponding channel resource in the current subframe according to the determined numbers of bits of feedback information; and when the result of the judgment by the base station is other case, determining, by the base station, that C bits of CSI feedback information have been transmitted by the user equipment in the current subframe, determining a number of bits of ACK/NACK feedback information transmitted by the user equipment in the current subframe as a number of bits of spatially-bundled ACK/NACK feedback information of all or a part of downlink carriers with multi-codeword transmission, and receiving the spatially-bundled ACK/NACK feedback information and the CSI feedback information transmitted by the user equipment concurrently on a corresponding channel resource in the current subframe according to the determined numbers of bits of feedback information, wherein the number of bits of spatially-bundled ACK/NACK feedback information does not exceed a value of A−C.

An embodiment of the invention in another aspect further provides a base station including:

a determining module configured to determine a minimum number $B_{min}$ of feedback bits and/or a maximum number $B_{max}$ of feedback bits of ACK/NACK, fed back by a user equipment, in a current subframe;

a judging module configured to select a downlink carrier and to judge a relationship between a number C of feedback bits for judgment corresponding to a CSI reporting type of the downlink carrier, and a threshold number A of concurrently transmitted UCI bits in the current subframe and $B_{min}$ and/or $B_{max}$;

a processing module configured, when a result of the judgment by the judging module is $C>A-B_{min}$, to determine that $B_{max}$ bits of ACK/NACK feedback information have been transmitted by the user equipment in the current subframe, and to receive the ACK/NACK feedback information transmitted by the user equipment on a corresponding channel resource in the current subframe according to the determined number of bits of feedback information;

when the result of the judgment by the judging module is $C \leq A-B_{max}$, to determine that $B_{max}$ bits of ACK/NACK feedback information and C bits of CSI feedback information have been transmitted by the user equipment in the current subframe, and to receive the ACK/NACK feedback information and the CSI feedback information transmitted by the user equipment concurrently on a corresponding channel resource in the current subframe according to the determined numbers of bits of feedback information; and when the result of the judgment by the judging module is other case, to determine that C bits of CSI feedback information have been transmitted by the user equipment in the current subframe, to determine a number of bits of ACK/NACK feedback information transmitted by the user equipment in the current subframe as a number of bits of spatially-bundled ACK/NACK feedback information of all or a part of downlink carriers with multi-codeword transmission, and to receive the spatially-bundled ACK/NACK feedback information and the CSI feedback information transmitted by the user equipment concurrently on a corresponding channel resource in the current subframe according to the determined numbers of bits of feedback information.

The technical solution according to the embodiments of the invention has the following advantages over the prior art:

By applying the technical solution of the embodiments of the invention, a method for transmitting ACK/NACK and periodic CSI concurrently on a corresponding channel resource in a current subframe is implemented, in which ACK/NACK bits and CSI bits transmitted concurrently in the current subframe are determined dynamically according to a threshold number of concurrently transmitted UCI bits in the current subframe, and a maximum number of feedback bits and a minimum number of feedback bits of ACK/NACK in the current subframe, thereby ensuring that a total number of concurrently transmitted UCI bits will not exceed the threshold number of concurrently transmitted UCI bits in the current subframe and bundling of ACK/NACK and dropping of CSI can be avoided as much as possible to thereby guarantee accuracy and integrity of uplink information transmission maximally.

DETAILED DESCRIPTION OF THE EMBODIMENTS

In order to make the objects, technical solutions and advantages of the invention more apparent, the invention will be further described below in details with reference to the drawings.

A maximum number of carrying bits in the existing PUCCH format 3 is 22, and as depicted in Table 1, it can be apparent that a maximum number of bits of CSI of one carrier is 11, and when ACK/NACK and periodic CSI are transmitted concurrently, there has been absent in the prior art a specific solution to how to determine transmission bits of ACK/NACK and CSI without exceeding a maximum number of carrying bits in the format 3, which is currently desirable to address.

In the LTE-A Rel-11 CA system, for a UE supporting the PUCCH format 3, concurrent transmission of ACK/NACK information of a plurality of aggregated carriers and periodic CSI of one carrier using PUCCH format 3 is supported, but there has been absent a specific method for allocating bits to carry ACK/NACK and CSI for concurrent transmission.

In order to overcome such a drawback, embodiments of the invention provide a method for transmitting UCI, and for a UE supporting PUCCH format 3 transmission scheme and concurrent transmission of ACK/NACK of a plurality of carriers and periodic CSI over a PUCCH, ACK/NACK bits and CSI bits transmitted concurrently in a current subframe are determined dynamically according to a maximum number A of feedback bits of various UCIs transmitted concurrently in the current subframe as well as a maximum number $B_{max}$ of feedback bits and a minimum number $B_{min}$ of feedback bits of ACK/NACK in the current subframe so that a total number of transmission bits will not exceed A.

Figure 1:
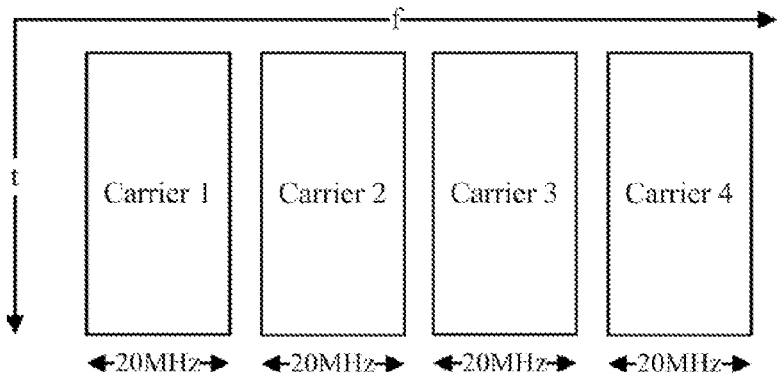
FIG. 1 is a schematic diagram of the application scheme of the CA technology in the prior art.
Figure 2:
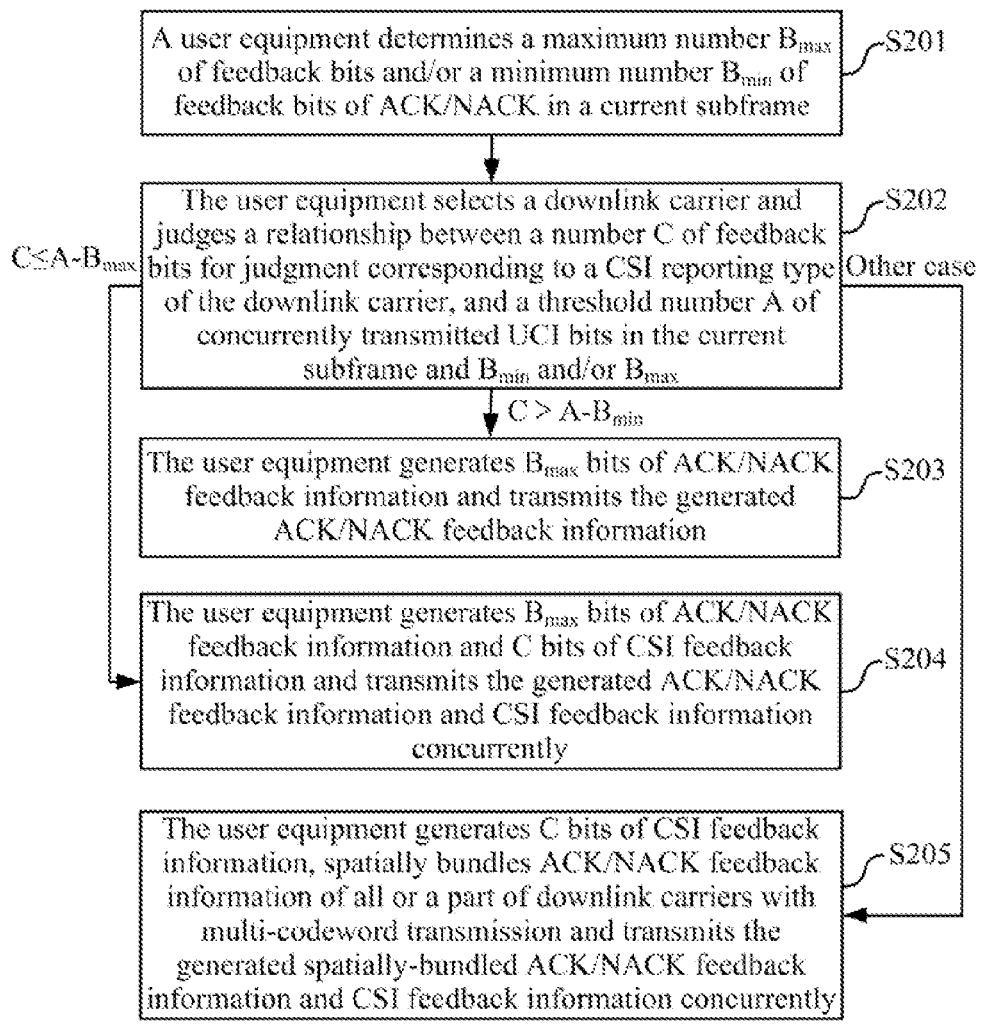
FIG. 2 is a schematic flow chart of a method for transmitting UCI according to an embodiment of the invention.

As illustrated in FIG. 2 which is a schematic flow chart of a method for transmitting UCI according to an embodiment of the invention, the method particularly includes the following operations:

In the operation S201, a user equipment determines a maximum number $B_{max}$ of feedback bits and/or a minimum number $B_{min}$ of feedback bits of ACK/NACK in a current subframe.

In a real application scenario, this operation is performed particularly as follows:

The user equipment determines $B_{min}$ according to a number N of configured carriers and a number $M_i$ of downlink subframes, on each carrier i, for which ACK/NACK needs to be fed back in the current subframe in accordance with the following equation:

$$B_{min} = \sum_{i=0}^{N-1} M_i;$$

and/or

The user equipment determines $B_{max}$ according to a number N of configured carriers, a transmission mode of each configured carrier and a number $M_i$ of downlink subframes, on each carrier i, for which ACK/NACK needs to be fed back in the current subframe in accordance with the following equation:

$$B_{max} = \sum_{i=0}^{N-1} C_i \cdot M_i;$$

Where $C_i$ takes a value under the following rule:

For a carrier with single-codeword transmission, $C_i=1$, and for a carrier with multi-codeword transmission, $C_i=2$; or For a carrier with single-codeword transmission or for a carrier with multi-codeword transmission and spatial bundling, $C_i=1$, and for a carrier with multi-codeword transmission and without spatial bundling, $C_i=2$; and $M_i$ represents the number of downlink subframes, on the carrier i, for which ACK/NACK needs to be fed back in the current subframe, and it takes a value under the following rule: for a Frequency Division Duplex (FDD) system, $M_i=1$; and for a Time Division Duplex (TDD) system, $M_i$ corresponding to different aggregated carriers take the same or different values.

In the operation S202, the user equipment selects a downlink carrier and judges a relationship between a number C of feedback bits for judgment corresponding to a Channel State Information (CSI) reporting type of the downlink carrier, and a threshold number A of concurrently transmitted UCI bits in the current subframe and $B_{min}$ and/or $B_{max}$.

When a result of the judgment by the user equipment is $C > A - B_{min}$, the flow proceeds to the operation S203;

When the result of the judgment by the user equipment is $C \leq A - B_{max}$, the flow proceeds to the operation S204;

When the result of the judgment by the user equipment is other case, the flow proceeds to the operation S205.

The threshold number A of bits is a predefined value or a value signaled via high-layer signaling or Physical Downlink Control Channel (PDCCH) signaling, A represents a positive integer, and A≤a maximum number of carrying bits in an uplink transmission scheme for transmitting ACK/NACK feedback information and CSI feedback information concurrently in the current subframe, or A≤a difference between the maximum number of carrying bits in the uplink transmission scheme and a number of SR bits.

It shall be noted that there are the following two situations for a process of this operation dependent upon different contents of C:

In a first situation, the user equipment selects a downlink carrier and judges a relationship between a number $C_{real}$ of real feedback bits corresponding to the CSI reporting type of the downlink carrier, and A and $B_{min}$ and/or $B_{max}$, that is, C represents the number $C_{real}$ of real feedback bits corresponding to the CSI reporting type of the downlink carrier.

In a second situation, the user equipment selects a downlink carrier and judges a relationship between the maximum number $C_{type\_max}$ of feedback bits corresponding to the CSI reporting type of the downlink carrier, and A and $B_{min}$ and/or $B_{max}$, that is, C represents the maximum number $C_{type\_max}$ of feedback bits corresponding to the CSI reporting type of the downlink carrier.

The maximum number $C_{type\_max}$ of feedback bits corresponding to the CSI reporting type is particularly as follows:

For a CSI reporting type of reporting based on a RI value, the maximum number $C_{type\_max}$ of feedback bits corresponding to the CSI reporting type is the largest one of numbers of feedback bits, in the CSI reporting type, corresponding to different RI values in a current configuration which particularly includes a CSI feedback mode and/or an antenna port configuration and other information in a particular process scenario; and For other CSI reporting types, the maximum number $C_{type\_max}$ of feedback bits corresponding to the CSI reporting type is a number of real feedback bits.

It shall be further noted that the value of A is a predefined value (without being signaled) or a value signaled via high-layer signaling or Physical Downlink Control Channel (PDCCH) signaling, and the value is any positive integer that does not exceed a maximum number of carrying bits in the PUCCH format or any positive integer that does not exceed a difference between the maximum number of carrying bits in the PUCCH format and a number of SR bits (1 bit).

In another aspect, in a real application, the user equipment selects a downlink carrier particularly in the following several implementations:

In a first implementation, the user equipment selects a downlink carrier with a highest priority CSI reporting type according to CSI reporting type priorities. When there are a plurality of downlink carriers with the highest priority CSI reporting type, one of the plurality of carriers with the lowest carrier index is selected according to indexes of the carriers.

In a second implementation, the user equipment selects a downlink carrier with the lowest carrier index directly according to carrier indexes.

In a third implementation, the user equipment determines a set of downlink carriers, for each of which the maximum number of feedback bits corresponding to the CSI reporting type does not exceed $(A-B_{min})$ bits, among downlink carriers with CSI feedback in the current subframe, and selects a downlink carrier with a highest priority CSI reporting type in the set of downlink carriers according to CSI reporting type priorities, where when there are a plurality of downlink carriers with the highest priority CSI reporting type in the set of downlink carriers, one of the plurality of carriers with the lowest carrier index is selected according to indexes of the carriers.

In a fourth implementation, the user equipment determines a set of downlink carriers, for each of which the maximum number of feedback bits corresponding to the CSI reporting type does not exceed $(A-B_{min})$ bits, among downlink carriers with CSI feedback in the current subframe, and selects a downlink carrier with the lowest carrier index in the set of downlink carriers directly according to carrier indexes.

In a fifth implementation, the user equipment determines a set of downlink carriers, for each of which the number of real feedback bits of the CSI reporting type does not exceed $(A-B_{min})$ bits, among downlink carriers with CSI feedback in the current subframe, and selects a downlink carrier with a highest priority CSI reporting type in the set of downlink carriers according to CSI reporting type priorities, where when there are a plurality of downlink carriers with the highest priority CSI reporting type in the set of downlink carriers, one of the plurality of carriers with the lowest carrier index is selected according to indexes of the carriers.

In a sixth implementation, the user equipment determines a set of downlink carriers, for each of which the number of real feedback bits of the CSI reporting type does not exceed $(A-B_{min})$ bits, among downlink carriers with CSI feedback in the current subframe, and selects a downlink carrier with the lowest carrier index in the set of downlink carriers directly according to carrier indexes.

In a real application, the downlink carrier can be selected in any one of the above implementations according to real requirements without departing from the scope of the invention.

It shall be further noted that in the third implementation, the fourth implementation, the fifth implementation and the sixth implementation, when the user equipment determines the set of downlink carriers, for each of which the maximum number of feedback bits or the real number of feedback bits corresponding to the CSI reporting type does not exceed $(A-Bmin)$ bits, among the downlink carriers with CSI feedback in the current subframe, if the set of downlink carriers determined by the user equipment is a null set, then the user equipment judges $C>A-Bmin$ directly, that is, the flow proceeds to the operation S203.

In the operation S203, the user equipment generates $B_{max}$ bits of ACK/NACK feedback information and transmits the generated ACK/NACK feedback information on a corresponding channel resource in the current subframe.

In correspondence to the first situation in the operation S202, a process of this operation is particularly as follows:

The user equipment generates the $B_{max}$ bits of ACK/NACK feedback information and transmits the generated ACK/NACK feedback information on the corresponding channel resource in the current subframe.

In correspondence to the second situation in the operation S202, a process of this operation is particularly as follows:

The user equipment generates the $B_{max}$ bits of ACK/NACK feedback information and transmits the generated $B_{max}$ bits of ACK/NACK feedback information on the corresponding channel resource in the current subframe.

In the operation S204, the user equipment generates $B_{max}$ bits of ACK/NACK feedback information and corresponding bits of CSI feedback information, and transmits the generated ACK/NACK feedback information and CSI feedback information concurrently on a corresponding channel resource in the current subframe.

In correspondence to the first situation in the operation S202, a process of this operation is particularly as follows:

The user equipment generates $B_{max}$ bits of ACK/NACK feedback information and $C_{real}$ bits of CSI feedback information, and transmits the generated ACK/NACK feedback information and CSI feedback information concurrently on a corresponding channel resource in the current subframe.

In correspondence to the second situation in the operation S202, a process of this operation is particularly as follows:

The user equipment generates $B_{max}$ bits of ACK/NACK feedback information and $C_{type\_max}$ bits of CSI feedback information, and transmits the generated $B_{max}$ bits of ACK/NACK feedback information and $C_{type\_max}$ bits of CSI feedback information concurrently on a corresponding channel resource in the current subframe.

The $C_{type\_max}$ bits of CSI feedback information are generated particularly as follows:

The user equipment generates $C_{real}$ bits of CSI feedback information; and

If $C_{real}<C_{type\_max}$, then the user equipment appends $(C_{type\_max}-C_{real})$ bits of placeholders to the $C_{real}$ bits of CSI feedback information, and determines the CSI feedback information with appended placeholders as the $C_{type\_max}$ bits of CSI feedback information. In a real application scenario, the placeholder is a fixed value, which can be 0 or 1 and preferably be 0, predefined between the user equipment and a base station.

If $C_{real} \geq C_{type\_max}$, then the user equipment determines the really generated $C_{real}$ bits of CSI feedback information as the $C_{type\_max}$ bits of CSI feedback information.

In the operation S205, the user equipment generates corresponding bits of CSI feedback information, spatially bundles ACK/NACK feedback information of all or a part of downlink carriers with multi-codeword transmission, and transmits the generated spatially-bundled ACK/NACK feedback information and CSI feedback information concurrently on a corresponding channel resource in the current subframe.

In correspondence to the first situation in the operation S202, a process of this operation is particularly as follows:

The user equipment generates $C_{real}$ bits of CSI feedback information, spatially bundles the ACK/NACK feedback information of all or a part of downlink carriers with multi-codeword transmission, and transmits the generated spatially-bundled ACK/NACK feedback information and CSI feedback information concurrently on the corresponding channel resource in the current subframe, where the number of bits of the spatially-bundled ACK/NACK feedback information does not exceed a value of $A-C_{real}$.

In correspondence to the second situation in the operation S202, a process of this operation is particularly as follows:

The user equipment generates $C_{type\_max}$ bits of CSI feedback information, spatially bundles the ACK/NACK feedback information of all or a part of downlink carriers with multi-codeword transmission, and transmits the generated spatially-bundled ACK/NACK feedback information and CSI feedback information concurrently on the corresponding channel resource in the current subframe, where the number of bits of the spatially-bundled ACK/NACK feedback information does not exceed a value of $A-C_{type\_max}$.

The $C_{type\_max}$ bits of CSI feedback information are generated particularly as follows:

The user equipment generates $C_{real}$ bits of CSI feedback information; and

If $C_{real} < C_{type\_max}$, then the user equipment appends $(C_{type\_max} - C_{real})$ bits of placeholders to the $C_{real}$ bits of CSI feedback information, and determines the CSI feedback information with appended placeholders as the $C_{type\_max}$ bits of CSI feedback information. In a real application scenario, the placeholder is a fixed value, which can be 0 or 1 and preferably be 0, predefined between the user equipment and a base station.

If $C_{real} \geq C_{type\_max}$, then the user equipment determines the really generated $C_{real}$ bits of CSI feedback information as the $C_{type\_max}$ bits of CSI feedback information.

It shall be further noted that when the current subframe is particularly a subframe in which a Scheduling Request (SR) is transmitted, the user equipment transmits the generated ACK/NACK feedback information, or the generated ACK/NACK feedback information and CSI feedback information concurrently, or the generated spatially-bundled ACK/NACK feedback information and CSI feedback information concurrently, on the corresponding channel resource in the current subframe particularly as follows:

The user equipment transmits the generated ACK/NACK feedback information and the 1-bit SR, or the generated ACK/NACK feedback information and CSI feedback information and the 1-bit SR concurrently, or the generated spatially-bundled ACK/NACK feedback information and CSI feedback information and the 1-bit SR concurrently, on the corresponding channel resource in the current subframe.

In another aspect, at the base station side, similar judgment processes to the operation S201 and the operation S202 above also need to be performed, and a particular reception mode and number of bits of UCI may be determined according to results of the judgments, in similar particular processes to the user equipment side except that the mode and number of bits in which the user equipment reports the UCI in the current subframe may be determined directly and the UCI may be received according to a corresponding result of the determination, instead of generating corresponding UCI according to the results of the judgments. The particular processes can be similar to the description above, so a repeated description thereof will be omitted here.

The technical solution according to the embodiment of the invention has the following advantages over the prior art:

With the technical solution of the embodiment of the invention, a method for transmitting ACK/NACK and periodic CSI concurrently on a corresponding channel resource in a current subframe is implemented, in which ACK/NACK bits and CSI bits transmitted concurrently in the current subframe are determined dynamically according to a threshold number of concurrently transmitted UCI bits in the current subframe, and a maximum number of feedback bits and a minimum number of feedback bits of ACK/NACK in the current subframe, thereby ensuring that a total number of concurrently transmitted UCI bits will not exceed the threshold number of concurrently transmitted UCI bits in the current subframe and bundling of ACK/NACK and dropping of CSI can be avoided as much as possible to thereby guarantee accuracy and integrity of uplink information transmission maximally.

The technical solution according to the embodiment of the invention will be described below in connection with particular application scenarios.

In a particular application scenario, in order to simplify a process flow, when parameters are determined similarly to the operation S201 above, all the parameters may not necessarily be determined at a time, and there may be a corresponding process flow somewhat varying with a different order in which the parameters are determined.

Furthermore there may be a corresponding process flow somewhat varying with a different particular content of the number of feedback bits for judgment corresponding to the CSI reporting type of the downlink carrier, particularly as described in the following embodiments.

In a first embodiment, initial judgment is made based on A and $B_{min}$, and the number of feedback bits for judgment is particularly the number $C_{real}$ of real feedback bits of the CSI reporting type.

Figure 3:
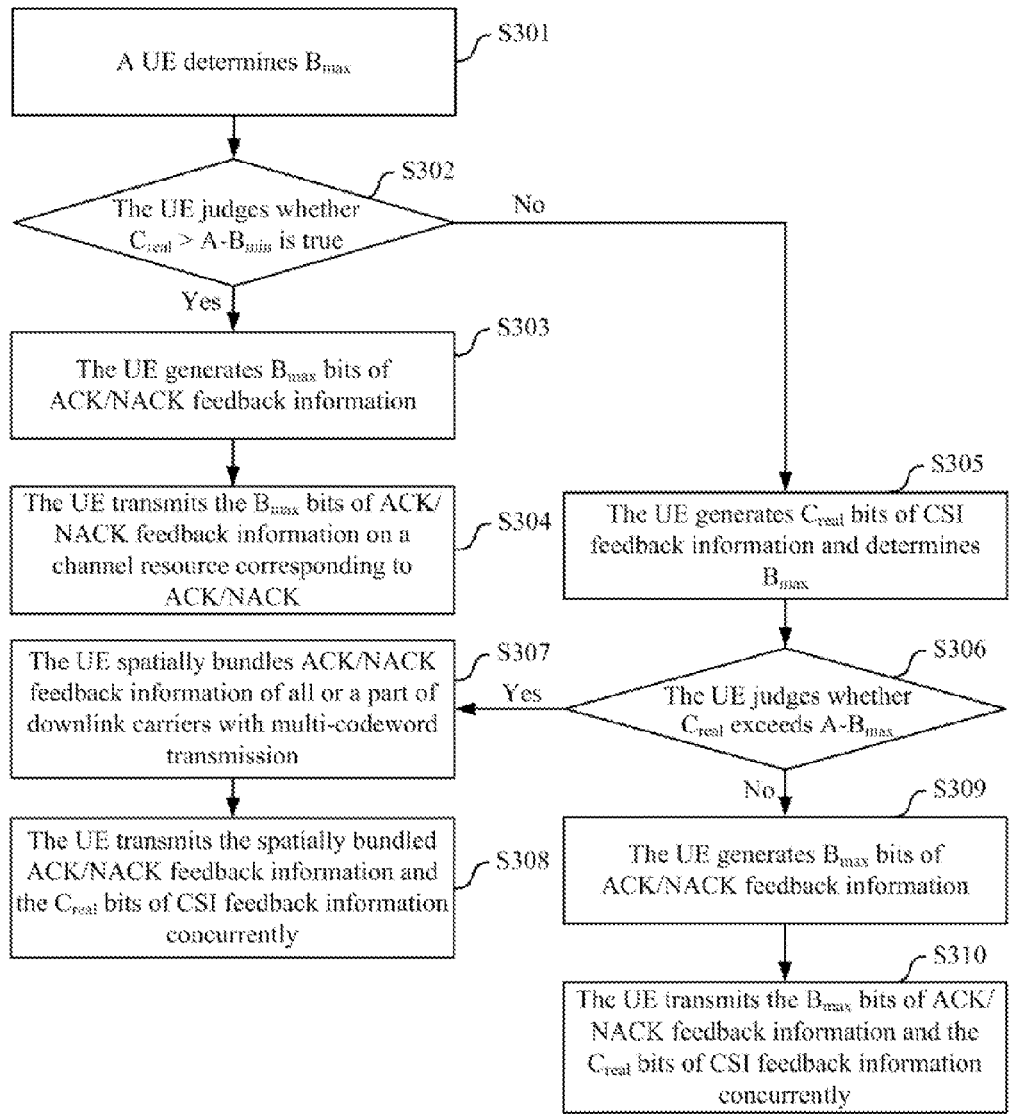
FIG. 3 is a schematic flow chart of a method for transmitting UCI according to a first embodiment of the invention.

As illustrated in FIG. 3 which is a schematic flow chart of a method for transmitting UCI according to the first embodiment of the invention, the method particularly includes the following operations:

In the operation S301, a UE determines a minimum number $B_{min}$ of feedback bits of ACK/NACK in a current subframe.

$B_{min}$ can be calculated in the equation as described in the operation S201 above, so a repeated description thereof will be omitted here.

In the operation S302, the UE selects a downlink carrier according to CSI reporting type priorities and/or carrier indexes, and judges whether a number of feedback bits for judgment corresponding to a CSI reporting type of the downlink carrier exceeds $A-B_{min}$, that is, the UE judges whether $C_{real} > A-B_{min}$ is true.

A represents a threshold number of concurrently transmitted UCI bits in the current subframe.

After this operation is performed, ACK/NACK feedback information, or ACK/NACK and CSI feedback information transmitted in the current subframe is determined according to a result of the judgment, and the feedback information is transmitted on a corresponding channel resource in the current subframe.

When the result of the judgment is positive, the UE determines that no CSI is to be transmitted in the current subframe and proceeds to the operation S303; and When the result of the judgment is negative, the UE proceeds to the operation S305.

In the operation S303, the UE generates $B_{max}$ bits of ACK/NACK feedback information according to a number N of configured carriers, a transmission mode of each configured carrier and a number $M_i$ of downlink subframes, on each carrier i, for which ACK/NACK needs to be fed back in the current subframe.

$B_{max}$ can be calculated in the equation as described in the operation S201 above, so a repeated description thereof will be omitted here.

In the operation S304, the UE transmits the $B_{max}$ bits of ACK/NACK feedback information on a channel resource corresponding to ACK/NACK.

In the operation S305, the UE generates $C_{real}$ bits of CSI feedback information of the selected downlink carrier, and determines the maximum number $B_{max}$ of feedback bits of ACK/NACK in the current subframe.

In the operation S306, the UE judges whether the number $C_{real}$ of CSI feedback bits of the downlink carrier exceeds $A-B_{max}$.

When a result of the judgment is positive, the UE proceeds to the operation S307.

When the result of the judgment is negative, the UE proceeds to the operation S309.

In the operation S307, the UE spatially bundles ACK/NACK feedback information of all or a part of downlink carriers with multi-codeword transmission so that the number of spatially bundled ACK/NACK feedback bits does not exceed $A-C_{real}$.

In the operation S308, the UE transmits the spatially bundled ACK/NACK feedback information and the $C_{real}$ bits of CSI feedback information concurrently on a channel resource corresponding to ACK/NACK or CSI.

In the operation S309, the UE generates $B_{max}$ bits of ACK/NACK feedback information according to a number N of configured carriers, a transmission mode of each configured carrier and a number $M_i$ of downlink subframes, on each carrier i, for which ACK/NACK needs to be fed back in the current subframe.

$B_{max}$ can be calculated in the equation as described in the operation S201 above, so a repeated description thereof will be omitted here.

In the operation S310, the UE transmits the $B_{max}$ bits of ACK/NACK feedback information and the $C_{real}$ bits of CSI feedback information concurrently on a channel resource corresponding to ACK/NACK or CSI.

In a second embodiment, initial judgment is made based on A and $B_{min}$, and the number of feedback bits for judgment is particularly the maximum number $C_{type\_max}$ of feedback bits of the CSI reporting type.

Figure 4:
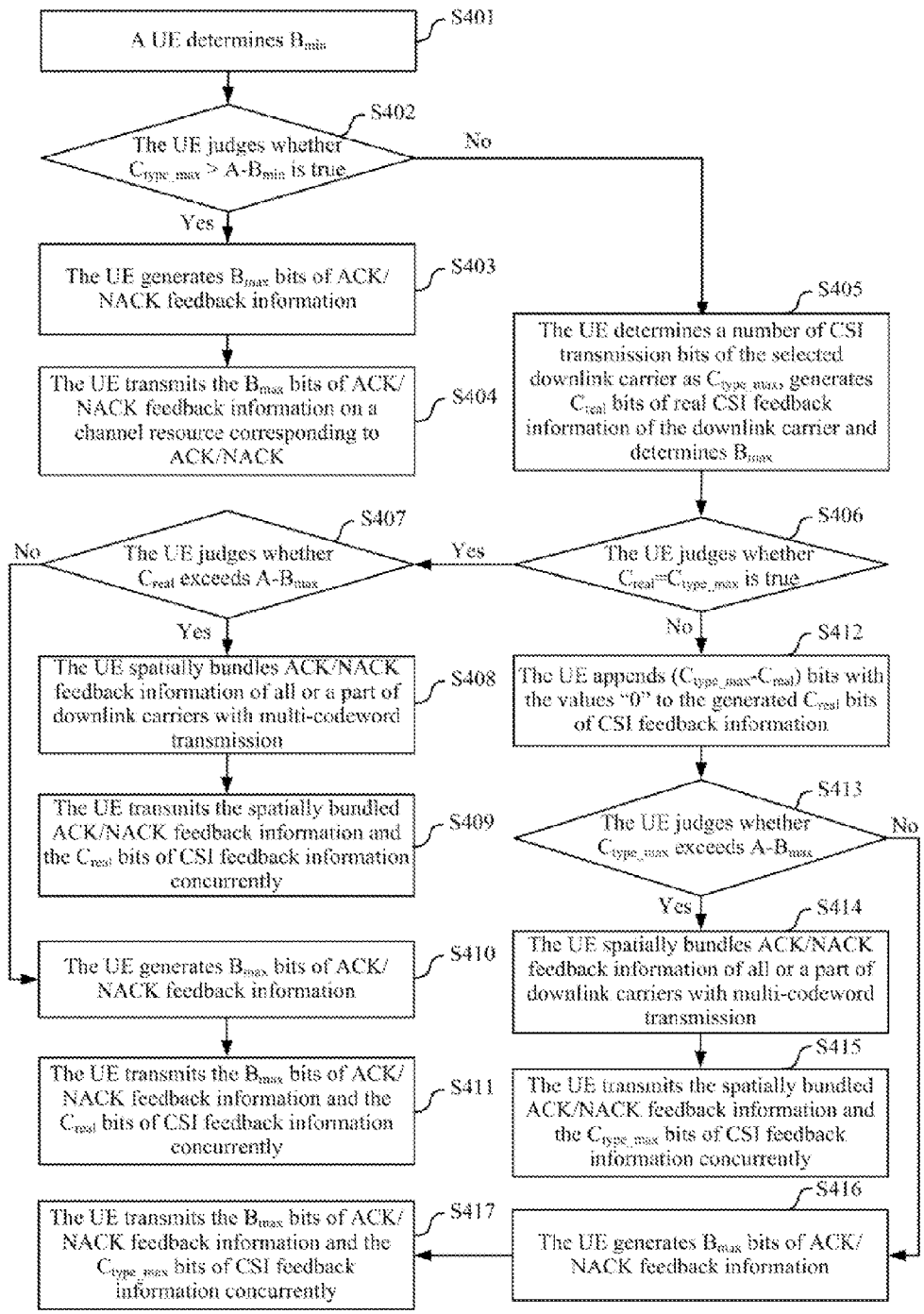
FIG. 4 is a schematic flow chart of a method for transmitting UCI according to a second embodiment of the invention.

As illustrated in FIG. 4 which is a schematic flow chart of a method for transmitting UCI according to the second embodiment of the invention, the method particularly includes the following operations:

In the operation S401, a UE determines a minimum number $B_{min}$ of feedback bits of ACK/NACK in a current subframe.

$B_{min}$ can be calculated in the equation as described in the operation S201 above, so a repeated description thereof will be omitted here.

In the operation S402, the UE selects a downlink carrier according to CSI reporting type priorities and/or carrier indexes, and judges whether a number of feedback bits for judgment corresponding to a CSI reporting type of the downlink carrier exceeds $A-B_{min}$, that is, the UE judges whether $C_{type\_max} > A-B_{min}$ is true.

A represents a threshold number of concurrently transmitted UCI bits in the current subframe.

After this operation is performed, ACK/NACK feedback information, or ACK/NACK and CSI feedback information transmitted in the current subframe is determined according to a result of the judgment, and the feedback information is transmitted on a corresponding channel resource in the current subframe.

When the result of the judgment is positive, the UE determines that no CSI is to be transmitted in the current subframe and proceeds to the operation S403; and When the result of the judgment is negative, the UE proceeds to the operation S405.

In the operation S403, the UE generates $B_{max}$ bits of ACK/NACK feedback information according to a number N of configured carriers, a transmission mode of each configured carrier and a number $M_i$ of downlink subframes, on each carrier i, for which ACK/NACK needs to be fed back in the current subframe.

$B_{max}$ can be calculated in the equation as described in the operation S201 above, so a repeated description thereof will be omitted here.

In the operation S404, the UE transmits the $B_{max}$ bits of ACK/NACK feedback information on a channel resource corresponding to ACK/NACK.

In the operation S405, the UE determines a number of CSI transmission bits, of the selected downlink carrier, to be transmitted in the current subframe as $C_{type\_max}$, generates $C_{real}$ bits of real CSI feedback information of the selected downlink carrier and determines the maximum number $B_{max}$ of feedback bits of ACK/NACK in the current subframe.

In the operation S406, the UE judges whether $C_{real} = C_{type\_max}$ is true.

When a result of the judgment is positive, the UE proceeds to the operation S407.

When the result of the judgment is negative, the UE proceeds to the operation S412.

In the operation S407, the UE judges whether the number $C_{real}$ of CSI feedback bits of the downlink carrier exceeds $A-B_{max}$.

When a result of the judgment is positive, the UE proceeds to the operation S408.

When the result of the judgment is negative, the UE proceeds to the operation S410.

In the operation S408, the UE spatially bundles ACK/NACK feedback information of all or a part of downlink carriers with multi-codeword transmission so that the number of spatially bundled ACK/NACK feedback bits does not exceed $A-C_{real}$.

In the operation S409, the UE transmits the spatially bundled ACK/NACK feedback information and the $C_{real}$ bits of CSI feedback information concurrently on a channel resource corresponding to ACK/NACK or CSI.

In the operation S410, the UE generates $B_{max}$ bits of ACK/NACK feedback information according to a number N of configured carriers, a transmission mode of each configured carrier and a number $M_i$ of downlink subframes, on each carrier i, for which ACK/NACK needs to be fed back in the current subframe.

$B_{max}$ can be calculated in the equation as described in the operation S201 above, so a repeated description thereof will be omitted here.

In the operation S411, the UE transmits the $B_{max}$ bits of ACK/NACK feedback information and the $C_{real}$ bits of CSI feedback information concurrently on a channel resource corresponding to ACK/NACK or CSI.

In the operation S412, the UE appends ($C_{type\_max}-C_{real}$) bits with the values "0" to the generated $C_{real}$ bits of real CSI feedback information, and determines the $C_{type\_max}$ bits of CSI feedback information with appended bits "0" as CSI feedback information to be transmitted by the UE in the current subframe.

In the operation S413, the UE judges whether the number $C_{type\_max}$ of CSI feedback bits of the downlink carrier exceeds $A-B_{max}$.

When a result of the judgment is positive, the UE proceeds to the operation S414.

When the result of the judgment is negative, the UE proceeds to the operation S416.

In the operation S414, the UE spatially bundles ACK/NACK feedback information of all or a part of downlink carriers with multi-codeword transmission so that the number of spatially bundled ACK/NACK feedback bits does not exceed $A-C_{type\_max}$.

In the operation S415, the UE transmits the spatially bundled ACK/NACK feedback information and the $C_{type\_max}$ bits of CSI feedback information concurrently on a channel resource corresponding to ACK/NACK or CSI.

In the operation S416, the UE generates $B_{max}$ bits of ACK/NACK feedback information according to a number N of configured carriers, a transmission mode of each configured carrier and a number $M_i$ of downlink subframes, on each carrier i, for which ACK/NACK needs to be fed back in the current subframe.

$B_{max}$ can be calculated in the equation as described in the operation S201 above, so a repeated description thereof will be omitted here.

In the operation S417, the UE transmits the $B_{max}$ bits of ACK/NACK feedback information and the $C_{type\_max}$ bits of CSI feedback information concurrently on a channel resource corresponding to ACK/NACK or CSI.

In a third embodiment, initial judgment is made based on A and $B_{max}$, and the number of feedback bits for judgment is particularly the real number $C_{real}$ of feedback bits of the CSI reporting type.

Figure 5:
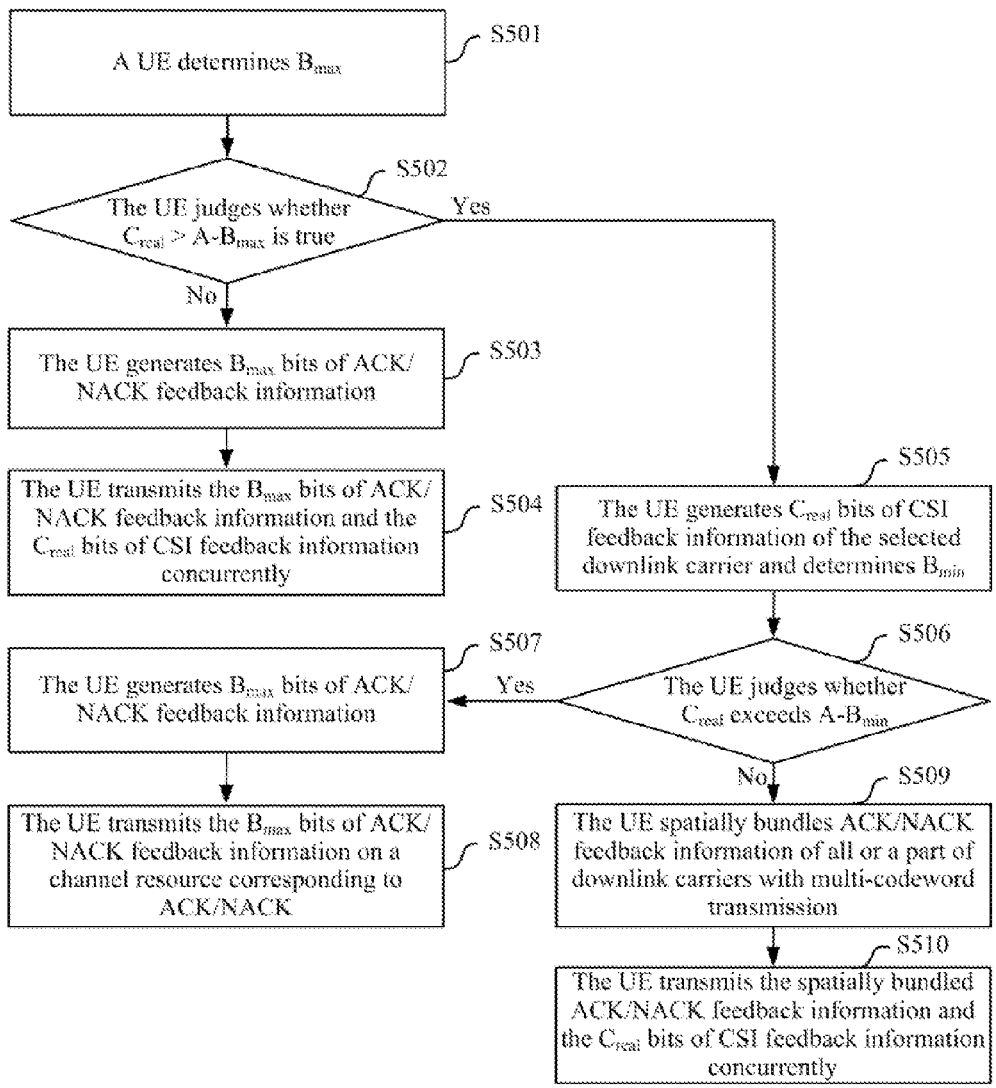
FIG. 5 is a schematic flow chart of a method for transmitting UCI according to a third embodiment of the invention.

As illustrated in FIG. 5 which is a schematic flow chart of a method for transmitting UCI according to the third embodiment of the invention, the method particularly includes the following operations:

In the operation S501, a UE determines a maximum number $B_{max}$ of feedback bits of ACK/NACK in a current subframe.

$B_{max}$ can be calculated in the equation as described in the operation S201 above, so a repeated description thereof will be omitted here.

In the operation S502, the UE selects a downlink carrier according to CSI reporting type priorities and/or carrier indexes and judges whether a number of feedback bits for judgment corresponding to a CSI reporting type of the downlink carrier exceeds $A-B_{max}$, that is, the UE judges whether $C_{real}>A-B_{max}$ is true.

A represents a threshold number of concurrently transmitted UCI bits in the current subframe.

After this operation is performed, ACK/NACK feedback information, or ACK/NACK and CSI feedback information transmitted in the current subframe is determined according to a result of the judgment, and the feedback information is transmitted on a corresponding channel resource in the current subframe.

When the result of the judgment is negative, the UE proceeds to the operation S503; and When the result of the judgment is positive, the UE proceeds to the operation S505.

In the operation S503, the UE generates $C_{real}$ bits of CSI feedback information of the selected downlink carrier, and generates $B_{max}$ bits of ACK/NACK feedback information according to a number N of configured carriers, a transmission mode of each configured carrier and a number $M_i$ of downlink subframes, on each carrier i, for which ACK/NACK needs to be fed back in the current subframe.

In the operation S504, the UE transmits the $B_{max}$ bits of ACK/NACK feedback information and the $C_{real}$ bits of CSI feedback information concurrently on a channel resource corresponding to ACK/NACK or CSI.

In the operation S505, the UE generates $C_{real}$ bits of CSI feedback information of the selected downlink carrier and determines a minimum number $B_{min}$ of feedback bits of ACK/NACK in the current subframe.

In the operation S506, the UE judges whether the number $C_{real}$ of CSI feedback bits of the downlink carrier exceeds $A-B_{min}$.

When a result of the judgment is positive, the UE determines that no CSI is to be transmitted in the current subframe and proceeds to the operation S507; and If the result of the judgment is negative, then the UE proceeds to the operation S509.

In the operation S507, the UE generates $B_{max}$ bits of ACK/NACK feedback information according to a number N of configured carriers, a transmission mode of each configured carrier and a number $M_i$ of downlink subframes, on each carrier i, for which ACK/NACK needs to be fed back in the current subframe.

$B_{max}$ can be calculated in the equation as described in the operation S201 above, so a repeated description thereof will be omitted here.

In the operation S508, the UE transmits the $B_{max}$ bits of ACK/NACK feedback information on a channel resource corresponding to ACK/NACK.

In the operation S509, the UE spatially bundles ACK/NACK feedback information of all or a part of downlink carriers with multi-codeword transmission so that the number of spatially bundled ACK/NACK feedback bits does not exceed $A-C_{real}$.

In the operation S510, the UE transmits the spatially bundled ACK/NACK feedback information and the $C_{real}$ bits of CSI feedback information concurrently on a channel resource corresponding to ACK/NACK or CSI.

In a fourth embodiment, initial judgment is made based on A and $B_{max}$, and the number of feedback bits for judgment is particularly the maximum number $C_{type\_max}$ of feedback bits of the CSI reporting type.

Figure 6:
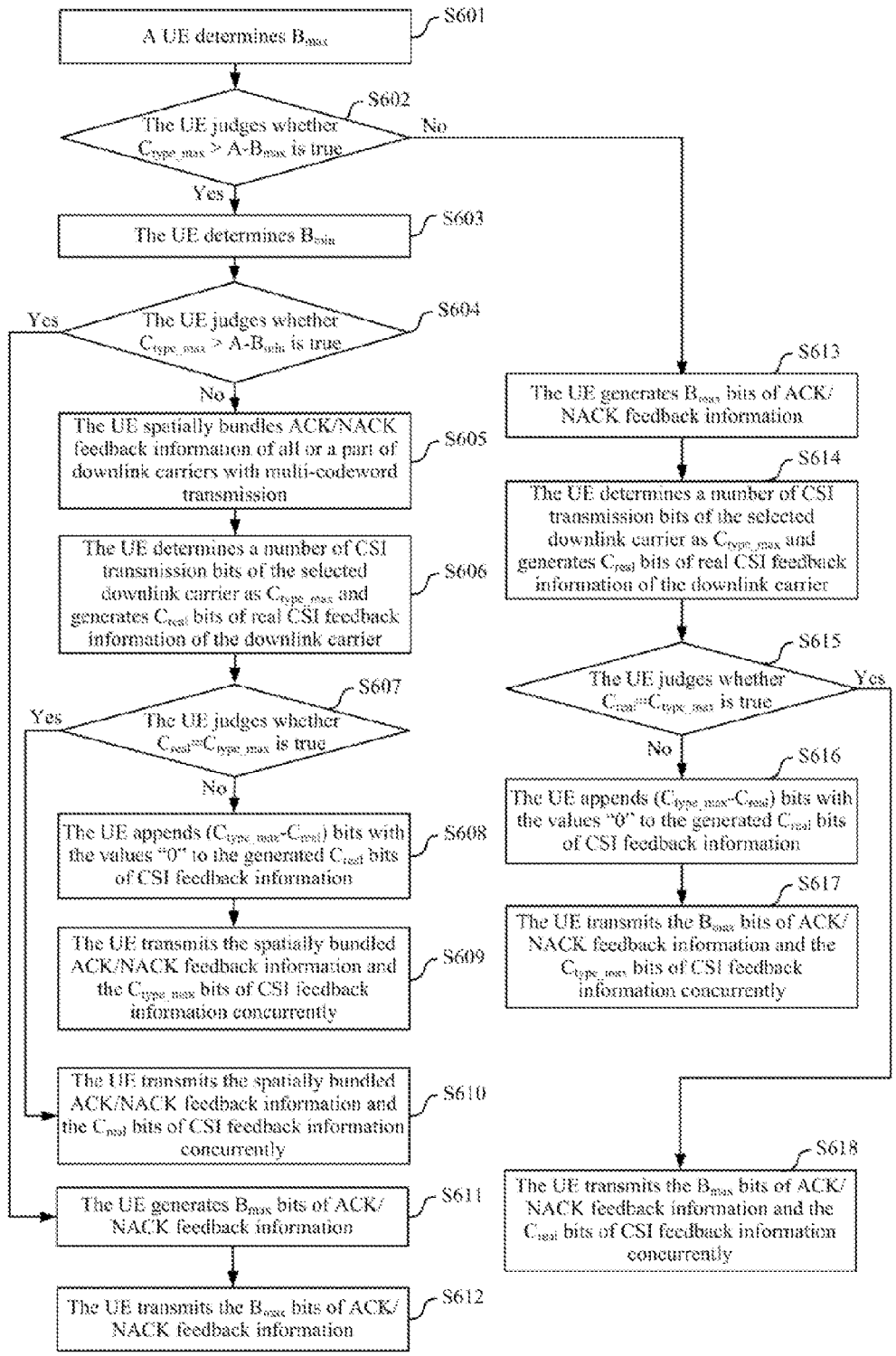
FIG. 6 is a schematic flow chart of a method for transmitting UCI according to a fourth embodiment of the invention.

As illustrated in FIG. 6 which is a schematic flow chart of a method for transmitting UCI according to the fourth embodiment of the invention, the method particularly includes the following operations:

In the operation S601, a UE determines a maximum number $B_{max}$ of feedback bits of ACK/NACK in a current subframe.

$B_{max}$ can be calculated in the equation as described in the operation S201 above, so a repeated description thereof will be omitted here.

In the operation S602, the UE selects a downlink carrier according to CSI reporting type priorities and/or carrier indexes, and judges whether a number of feedback bits for judgment corresponding to a CSI reporting type of the downlink carrier exceeds $A-B_{max}$, that is, the UE judges whether $C_{type\_max}>A-B_{max}$ is true.

A represents a threshold number of concurrently transmitted UCI bits in the current subframe.

After this operation is performed, ACK/NACK feedback information, or ACK/NACK and CSI feedback information transmitted in the current subframe is determined according to a result of the judgment, and the feedback information is transmitted on a corresponding channel resource in the current subframe.

When the result of the judgment is positive, the UE proceeds to the operation S603; and When the result of the judgment is negative, the UE proceeds to the operation S613.

In the operation S603, the UE determines a minimum number $B_{min}$ of feedback bits of ACK/NACK in the current subframe.

$B_{min}$ can be calculated in the equation as described in the operation S201 above, so a repeated description thereof will be omitted here.

In the operation S604, the UE judges whether $C_{type\_max} > A - B_{min}$ is true.

When a result of the judgment is negative, the UE proceeds to the operation S605; and When the result of the judgment is positive, the UE proceeds to the operation S611.

In the operation S605, the UE spatially bundles ACK/NACK feedback information of all or a part of downlink carriers with multi-codeword transmission so that the number of spatially bundled ACK/NACK feedback bits does not exceed $A - C_{type\_max}$.

In the operation S606, the UE determines a number of CSI transmission bits, of the selected downlink carrier, to be transmitted in the current subframe as $C_{type\_max}$, and generates $C_{real}$ bits of real CSI feedback information of the selected downlink carrier.

In the operation S607, the UE judges whether $C_{real} = C_{type\_max}$ is true.

When a result of the judgment is negative, the UE proceeds to the operation S608.

When the result of the judgment is positive, the UE proceeds to the operation S610.

In the operation S608, the UE appends $(C_{type\_max} - C_{real})$ bits with the values "0" to the generated $C_{real}$ bits of real CSI feedback information, and determines the $C_{type\_max}$ bits of CSI feedback information with the appended bits "0" as CSI feedback information to be transmitted by the UE in the current subframe.

In the operation S609, the UE transmits the spatially bundled ACK/NACK feedback information and the $C_{type\_max}$ bits of CSI feedback information concurrently on a channel resource corresponding to ACK/NACK or CSI.

In the operation S610, the UE transmits the spatially bundled ACK/NACK feedback information and the $C_{real}$ bits of CSI feedback information concurrently on a channel resource corresponding to ACK/NACK or CSI.

In the operation S611, the UE generates $B_{max}$ bits of ACK/NACK feedback information according to a number N of configured carriers, a transmission mode of each configured carrier and a number $M_i$ of downlink subframes, on each carrier i, for which ACK/NACK needs to be fed back in the current subframe.

$B_{max}$ can be calculated in the equation as described in the operation S201 above, so a repeated description thereof will be omitted here.

In the operation S612, the UE transmits the $B_{max}$ bits of ACK/NACK feedback information on a channel resource corresponding to ACK/NACK.

In the operation S613, the UE generates $B_{max}$ bits of ACK/NACK feedback information according to a number N of configured carriers, a transmission mode of each configured carrier and a number $M_i$ of downlink subframes, on each carrier i, for which ACK/NACK needs to be fed back in the current subframe.

$B_{max}$ can be calculated in the equation as described in the operation S201 above, so a repeated description thereof will be omitted here.

In the operation S614, the UE determines a number of CSI transmission bits, of the selected downlink carrier, to be transmitted in the current subframe as $C_{type\_max}$ and generates $C_{real}$ bits of real CSI feedback information of the selected downlink carrier.

In the operation S615, the UE judges whether $C_{real} = C_{type\_max}$ is true.

When a result of the judgment is negative, the UE proceeds to the operation S616.

When the result of the judgment is positive, the UE proceeds to the operation S618.

In the operation S616, the UE appends $(C_{type\_max} - C_{real})$ bits with the values "0" to the generated $C_{real}$ bits of real CSI feedback information, and determines the $C_{type\_max}$ bits of CSI feedback information with appended bits "0" as CSI feedback information to be transmitted by the UE in the current subframe.

In the operation S617, the UE transmits the $B_{max}$ bits of ACK/NACK feedback information and the $C_{type\_max}$ bits of CSI feedback information concurrently on a channel resource corresponding to ACK/NACK or CSI.

In the operation S618, the UE transmits the $B_{max}$ bits of ACK/NACK feedback information and the $C_{real}$ bits of CSI feedback information concurrently on a channel resource corresponding to ACK/NACK or CSI.

In correspondence to the four embodiments above, a condition of the UCI transmitted by the UE needs to be determined at the base station side, so the base station can make judgment similarly under the rules in the four embodiments above except that the base station may not generate the corresponding UCI feedback information but only determine the number of UCI bits reported by the UE and the transmission resource corresponding thereto so that the corresponding UCI can be received, so this will not be described again but will also fall into the scope of the invention.

With regard to the technical solutions according to the respective embodiments above, it shall be further noted as follows:

(1) For a CSI reporting type (the type 1/1a/2/2a/2b/2c) of reporting based upon a RI value, the maximum number of feedback bits corresponding to the CSI reporting type is the largest one of numbers of feedback bits, in the CSI reporting type, corresponding to different RI values in a current antenna port configuration; and for other CSI reporting types (the type 3/4/5/6), the maximum number of feedback bits corresponding to the CSI reporting type is the number of real feedback bits.

For example, in the reporting type 2, as depicted in Table 1, in the feedback mode 1-1 or 1-2, for a user equipment transmitting via 2 antenna ports, there are corresponding 6 bits at RI=1 and 8 bits at RI>1, so the maximum number of CSI feedback bits corresponding to the CSI reporting type 2 is 8 bits and the minimum number of CSI feedback bits corresponding to the CSI reporting type 2 is 6 bits in a 2-antenna port configuration.

In another example, in the reporting type 3, a particular number of reporting bits is independent on a value of RI, and when there is a selected downlink carrier with 4-layer transmission in a current subframe, a number of real bits of the CSI reporting type is 2 bits, so both the maximum and minimum numbers of CSI feedback bits corresponding to the CSI reporting type 3 are 2 bits.

(2) A PUCCH format by which the UCI is transmitted can be the PUCCH format 2 or 3 or another newly defined large-capacity PUCCH format, e.g., a PUCCH format based on PUSCH transmission structure.

When the PUCCH format is the format 3, the PUCCH format 3 channel resource can be a channel resource corresponding to ACK/NACK or a channel resource corresponding to periodic CSI.

Preferably when ACK/NACK is configured to be transmitted using the PUCCH format 3, the PUCCH format 3 channel resource can be a channel resource corresponding to ACK/NACK, and when ACK/NACK is configured to be transmitted using the PUCCH format 1b with channel selection, the PUCCH format 3 channel resource can be a channel resource corresponding to CSI.

(3) As described above, the value of A is a predefined value (without being signaled) or a value signaled via high-layer signaling or PDCCH signaling, and the value is any positive integer that does not exceed a maximum number of carrying bits in the PUCCH format or any positive integer that does not exceed a difference between the maximum number of carrying bits of the PUCCH format and a number of SR bits.

When the PUCCH format is the format 3, examples are listed as follows:

For a scenario where the number of feedback bits for judgment is particularly the number $C_{real}$ of real feedback bits of the CSI reporting type, A=21 or A=22 is predefined; or A=21 is predefined in a subframe in which an SR is transmitted, and A=22 is predefined in a subframe in which no SR is transmitted; or For a scenario where the number of feedback bits for judgment is particularly the maximum number $C_{type\_max}$ of feedback bits of the CSI reporting type, A=21 or A=22 is predefined for the type 3/4/5/6; or A=21 is predefined in a subframe in which an SR is transmitted, and A=22 is predefined in a subframe in which no SR is transmitted; and for other types other than the type 3/4/5/6, any positive integer that does not exceed 21 or 22 is predefined, or is signaled via high-layer signaling or PDCCH signaling, according to a number of ACK/NACK feedback bits and a number of CSI feedback bits; or For each CSI reporting type, according to a number A1 of ACK/NACK bits fed back in a subframe and the maximum number A2 of feedback bits of the CSI reporting type, A=min(A1+A2, 22) or A=min(A1+A2, 22-ASR) is predefined, or is configured by signaling, or A is any positive integer that does not exceed min(A1+A2, 22) or min(A1+A2, 22-ASR), where the ASR represents a number of SR bits, which can be predefined to 1 in an SR subframe and 0 in a non-SR frame, or to 1 or 0 in all the subframes.

It shall be further noted that the methods according to the respective embodiments above can also be applicable to intra-band CA and inter-band CA and applicable to a scenario of inter-band aggregation of carriers with different TDD uplink/downlink configurations.

The methods according to the respective embodiments above can also be applicable to a UE configured with a plurality of carriers and a UE configured with one carrier.

The methods according to the respective embodiments above can also be applicable to FDD and TDD systems.

The technical solution according to the embodiments of the invention has the following advantages over the prior art:

By applying the technical solution of the embodiments of the invention, a method for transmitting ACK/NACK and periodic CSI concurrently on a corresponding channel resource in a current subframe is implemented, in which ACK/NACK bits and CSI bits transmitted concurrently in the current subframe are determined dynamically according to a threshold number of concurrently transmitted UCI bits in the current subframe, and a maximum number of feedback bits and a minimum number of feedback bits of ACK/NACK in the current subframe, thereby ensuring that a total number of concurrently transmitted UCI bits will not exceed the threshold number of concurrently transmitted UCI bits in the current subframe and bundling of ACK/NACK and dropping of CSI can be avoided as much as possible to thereby guarantee accuracy and integrity of uplink information transmission maximally.

Figure 7:
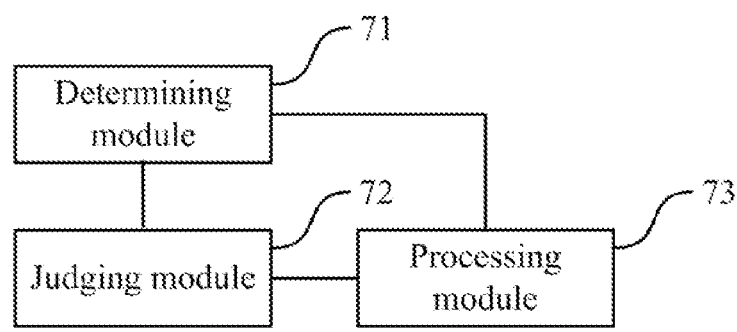
FIG. 7 is a schematic structural diagram of a user equipment according to an embodiment of the invention.

In order to implement the technical solution of the embodiments of the invention, an embodiment of the invention further provides a user equipment, and FIG. 7 illustrates a schematic structural diagram thereof, and the user equipment includes at least the following modules:

A determining module 71 is configured to determine a minimum number $B_{min}$ of feedback bits and/or a maximum number $B_{max}$ of feedback bits of ACK/NACK in a current subframe;

A judging module 72 is configured to select a downlink carrier and to judge a relationship between a number C of feedback bits for judgment corresponding to a CSI reporting type of the downlink carrier, and a threshold number A of concurrently transmitted UCI bits in the current subframe and $B_{min}$ and/or $B_{max}$;

A processing module 73 is configured, when a result of the judgment by the judging module 72 is $C>A-B_{min}$, to generate $B_{max}$ bits of ACK/NACK feedback information, and to transmit the generated ACK/NACK feedback information on a corresponding channel resource in the current subframe;

When the result of the judgment by the judging module 72 is $C \leq A-B_{max}$, to generate $B_{max}$ bits of ACK/NACK feedback information and C bits of CSI feedback information, and to transmit the generated ACK/NACK feedback information and CSI feedback information concurrently on a corresponding channel resource in the current subframe; and When the result of the judgment by the judging module 72 is other case, to generate C bits of CSI feedback information, to spatially bundle ACK/NACK feedback information of all or a part of downlink carriers with multi-codeword transmission, and to transmit the generated spatially-bundled ACK/NACK feedback information and CSI feedback information concurrently on a corresponding channel resource in the current subframe, where a number of bits of the spatially-bundled ACK/NACK feedback information does not exceed a value of A−C.

Particularly the determining module 71 is configured:

To determine $B_{min}$ according to a number N of configured carriers and a number $M_i$ of downlink subframes, on each carrier i, for which ACK/NACK needs to be fed back in the current subframe in accordance with the following equation:

$$B_{min} = \sum_{i=0}^{N-1} M_i;$$

and/or

To determine $B_{max}$ according to a number N of configured carriers, a transmission mode of each configured carrier and a number $M_i$ of downlink subframes, on each carrier i, for which ACK/NACK needs to be fed back in the current subframe in accordance with the following equation:

$$B_{max} = \sum_{i=0}^{N-1} C_i \cdot M_i;$$

Where $C_i$ takes a value under the following rule:

For a carrier with single-codeword transmission, $C_i=1$, and for a carrier with multi-codeword transmission, $C_i=2$; or For a carrier with single-codeword transmission or for a carrier with multi-codeword transmission and spatial bundling, $C_i=1$, and for a carrier with multi-codeword transmission and without spatial bundling, $C_i=2$; and $M_i$ represents the number of downlink subframes, on the carrier i, for which ACK/NACK needs to be fed back in the current subframe, and it takes a value under the following rule: for a Frequency Division Duplex (FDD) system, $M_i=1$; and for a Time Division Duplex (TDD) system, $M_i$ corresponding to the different aggregated carriers take the same or different values.

It shall be noted that the judging module 72 is particularly configured:

To select a downlink carrier and to judge a relationship between a number $C_{real}$ of real feedback bits corresponding to the CSI reporting type of the downlink carrier, and A and $B_{min}$ and/or $B_{max}$; or To select a downlink carrier and to judge a relationship between the maximum number $C_{type\_max}$ of feedback bits corresponding to the CSI reporting type of the downlink carrier, and A and $B_{min}$ and/or $B_{max}$.

In an application scenario, when the judging module 72 judges the relationship between the number $C_{real}$ of real feedback bits corresponding to the CSI reporting type of the downlink carrier, and A and $B_{min}$ and/or $B_{max}$, the processing module 73 is configured:

When a result of the judgment by the judging module 72 is $C_{real}>A-B_{min}$, to generate $B_{max}$ bits of ACK/NACK feedback information and, to transmit the generated ACK/NACK feedback information on a corresponding channel resource in the current subframe;

When the result of the judgment by the judging module 72 is $C_{real} \leq A-B_{max}$, to generate $B_{max}$ bits of ACK/NACK feedback information and $C_{real}$ bits of CSI feedback information, and to transmit the generated ACK/NACK feedback information and CSI feedback information concurrently on a corresponding channel resource in the current subframe; and When the result of the judgment by the judging module 72 is other case, to generate $C_{real}$ bits of CSI feedback information, to spatially bundle ACK/NACK feedback information of all or a part of downlink carriers with multi-codeword transmission, and to transmit the generated spatially-bundled ACK/NACK feedback information and CSI feedback information concurrently on a corresponding channel resource in the current subframe, where a number of bits of the spatially-bundled ACK/NACK feedback information does not exceed a value of $A-C_{real}$.

In another scenario, when the judging module 72 judges the relationship between the maximum number $C_{type\_max}$ of feedback bits corresponding to the CSI reporting type of the downlink carrier, and A and $B_{min}$ and/or $B_{max}$, the processing module 73 is configured:

When a result of the judgment by the judging module 72 is $C_{type\_max}>A-B_{min}$, to generate $B_{max}$ bits of ACK/NACK feedback information, and to transmit the generated $B_{max}$ bits of ACK/NACK feedback information on a corresponding channel resource in the current subframe;

When the result of the judgment by the judging module 72 is $C_{type\_max} \leq A-B_{max}$, to generate $B_{max}$ bits of ACK/NACK feedback information and $C_{type\_max}$ bits of CSI feedback information, and to transmit the generated $B_{max}$ bits of ACK/NACK feedback information and $C_{type\_max}$ bits of CSI feedback information concurrently on a corresponding channel resource in the current subframe; and When the result of the judgment by the judging module 72 is other case, to generate $C_{type\_max}$ bits of CSI feedback information, to spatially bundle ACK/NACK feedback information of all or a part of downlink carriers with multi-codeword transmission, and to transmit the generated spatially-bundled ACK/NACK feedback information and $C_{type\_max}$ bits of CSI feedback information concurrently on a corresponding channel resource in the current subframe, where a number of bits of the spatially-bundled ACK/NACK feedback information does not exceed a value of $A-C_{type\_max}$.

When the result of the judgment by the judging module 72 is $C_{type\_max} \leq A-B_{max}$ or the other case, the processing module 73 generates the $C_{type\_max}$ bits of CSI feedback information particularly as follows:

To generate $C_{real}$ bits of CSI feedback information; and

If $C_{real}<C_{type\_max}$, to append $(C_{type\_max}-C_{real})$ bits of placeholders to the $C_{real}$ bits of CSI feedback information and to determine the CSI feedback information with appended placeholders as the $C_{type\_max}$ bits of CSI feedback information; and If $C_{real}=C_{type\_max}$, to determine the really generated $C_{real}$ bits of CSI feedback information as the $C_{type\_max}$ bits of CSI feedback information.

It shall be noted that the judging module 72 is particularly configured:

To select a downlink carrier with a highest priority CSI reporting type according to CSI reporting type priorities, where when there are a plurality of downlink carriers with the highest priority CSI reporting type, one of the plurality of carriers with the lowest carrier index is selected according to indexes of the carriers; or To select a downlink carrier with the lowest carrier index directly according to carrier indexes; or To determine a set of downlink carriers, for each of which the maximum number of feedback bits corresponding to the CSI reporting type does not exceed $(A-B_{min})$ bits, among downlink carriers with CSI feedback in the current subframe, and to select a downlink carrier with a highest priority CSI reporting type in the set of downlink carriers according to CSI reporting type priorities, where when there are a plurality of downlink carriers with the highest priority CSI reporting type in the set of downlink carriers, one of the plurality of carriers with the lowest carrier index is selected according to indexes of the carriers; or To determine a set of downlink carriers, for each of which the maximum number of feedback bits corresponding to the CSI reporting type does not exceed $(A-B_{min})$ bits, among downlink carriers with CSI feedback in the current subframe, and to select a downlink carrier with the lowest carrier index in the set of downlink carriers directly according to carrier indexes; or To determine a set of downlink carriers, for each of which the number of real feedback bits of the CSI reporting type does not exceed $(A-B_{min})$ bits, among downlink carriers with CSI feedback in the current subframe, and to select a downlink carrier with a highest priority CSI reporting type in the set of downlink carriers according to CSI reporting type priorities, where when there are a plurality of downlink carriers with the highest priority CSI reporting type in the set of downlink carriers, one of the plurality of carriers with the lowest carrier index is selected according to indexes of the carriers; or To determine a set of downlink carriers, for each of which the number of real feedback bits of the CSI reporting type does not exceed $(A-B_{min})$ bits, among downlink carriers with CSI feedback in the current subframe, and to select a downlink carrier with the lowest carrier index in the set of downlink carriers directly according to carrier indexes.

When the judging module 72 determines the set of downlink carriers, for each of which the maximum number of feedback bits corresponding to the CSI reporting type does not exceed $(A-B_{min})$ bits, among downlink carriers with CSI feedback in the current subframe, or when the judging module 72 determines the set of downlink carriers, for each of which the number of real feedback bits of the CSI reporting type does not exceed $(A-B_{min})$ bits, among downlink carriers with CSI feedback in the current subframe, the judging module 72 is configured:

To judge $C>A-B_{min}$ directly if the set of downlink carriers determined by the judging module 72 is a null set.

In another application scenario, the determining module 71 is further configured:

For a CSI reporting type of reporting based upon a Rank Indicator (RI) value, to determine the maximum number $C_{type\_max}$ of feedback bits corresponding to the CSI reporting type as the largest one of numbers of feedback bits, in the CSI reporting type, corresponding to different RI values in a current configuration; and For other CSI reporting types, to determine the maximum number $C_{type\_max}$ of feedback bits corresponding to the CSI reporting type as a number of real feedback bits.

When the current subframe is a sub-frame in which a Scheduling Request (SR) is transmitted, the processing module 73 is configured:

To transmit the generated ACK/NACK feedback information and a 1-bit SR, or the generated ACK/NACK feedback information and CSI feedback information and a 1-bit SR concurrently, or the generated spatially-bundled ACK/NACK feedback information and CSI feedback information and a 1-bit SR concurrently, on the corresponding channel resource in the current subframe.

Furthermore the determining module 71 is configured to determine the threshold number A of bits as predefined or from configuration information obtained via high-layer signaling or Physical Downlink Control Channel (PDCCH) signaling, where the value of A is any positive integer that does not exceed a maximum number of carrying bits in an uplink transmission scheme for transmitting ACK/NACK feedback information and CSI feedback information concurrently in the current subframe or any positive integer that does not exceed a difference between the maximum number of carrying bits in the uplink transmission scheme and a number of SR bits.

Figure 8:
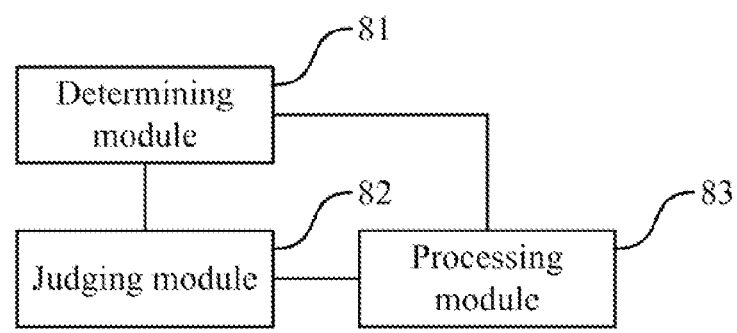
FIG. 8 is a schematic structural diagram of a base station according to an embodiment of the invention.

In another aspect, an embodiment of the invention further provides a base station, and FIG. 8 illustrates a schematic structural diagram thereof, the base station includes the following modules:

A determining module 81 is configured to determine a minimum number $B_{min}$ of feedback bits and/or a maximum number $B_{max}$ of feedback bits of ACK/NACK, fed back by a user equipment, in a current subframe;

A judging module 82 is configured to select a downlink carrier and to judge a relationship between a number C of feedback bits for judgment corresponding to a CSI reporting type of the downlink carrier, and a threshold number A of concurrently transmitted UCI bits in the current subframe and $B_{min}$ and/or $B_{max}$;

A processing module 83 is configured, when a result of the judgment by the judging module 82 is $C>A-B_{min}$, to determine that $B_{max}$ bits of ACK/NACK feedback information have been transmitted by the user equipment in the current subframe, and to receive the ACK/NACK feedback information transmitted by the user equipment on a corresponding channel resource in the current subframe according to the determined number of bits of feedback information;

When the result of the judgment by the judging module 82 is $C \leq A-B_{max}$, to determine that $B_{max}$ bits of ACK/NACK feedback information and C bits of CSI feedback information have been transmitted by the user equipment in the current subframe, and to receive the ACK/NACK feedback information and the CSI feedback information transmitted by the user equipment concurrently on a corresponding channel resource in the current subframe according to the determined numbers of bits of feedback information; and When the result of the judgment by the judging module 82 is other case, to determine that C bits of CSI feedback information have been transmitted by the user equipment in the current subframe, to determine a number of bits of ACK/NACK feedback information transmitted by the user equipment in the current subframe as a number of bits of spatially-bundled ACK/NACK feedback information of all or a part of downlink carriers with multi-codeword transmission, and to receive the spatially-bundled ACK/NACK feedback information and the CSI feedback information transmitted by the user equipment concurrently on a corresponding channel resource in the current subframe according to the determined numbers of bits of feedback information.

Particularly the determining module 81 is configured:

To determine $B_{min}$ according to a number N of configured carriers corresponding to the user equipment and a number $M_i$ of downlink subframes, on each carrier i, for which ACK/NACK needs to be fed back in the current subframe in accordance with the following equation:

$$B_{min} = \sum_{i=0}^{N-1} M_i;$$

and/or

To determine $B_{max}$ according to a number N of configured carriers corresponding to the user equipment, a transmission mode of each configured carrier and a number $M_i$ of downlink subframes, on each carrier i, for which ACK/NACK needs to be fed back in the current subframe in accordance with the following equation:

$$B_{max} = \sum_{i=0}^{N-1} C_i \cdot M_i;$$

Where $C_i$ takes a value under the following rule:

For a carrier with single-codeword transmission, $C_i=1$, and for a carrier with multi-codeword transmission, $C_i=2$; or For a carrier with single-codeword transmission or for a carrier with multi-codeword transmission and spatial bundling, $C_i=1$, and for a carrier with multi-codeword transmission and without spatial bundling, $C_i=2$; and $M_i$ represents the number of downlink subframes, on the carrier i, for which ACK/NACK needs to be fed back in the current subframe, and it takes a value under the following rule: for an FDD system, $M_i=1$; and for a TDD system, $M_i$ corresponding to the different aggregated carriers take the same or different values.

It shall be noted that the judging module 82 is configured:

To select a downlink carrier and to judge a relationship between a number $C_{real}$ of real feedback bits corresponding to the CSI reporting type of the downlink carrier, and A and $B_{min}$ and/or $B_{max}$; or To select a downlink carrier and to judge a relationship between the maximum number $C_{type\_max}$ of feedback bits corresponding to the CSI reporting type of the downlink carrier, and A and $B_{min}$ and/or $B_{max}$.

In an application scenario, when the judging module 82 judges the relationship between the number $C_{real}$ of real feedback bits corresponding to the CSI reporting type of the downlink carrier, and A and $B_{min}$ and/or $B_{max}$, the processing module 83 is configured:

When a result of the judgment by the judging module 82 is $C_{real}>A-B_{min}$, to determine that $B_{max}$ bits of ACK/NACK feedback information have been transmitted by the user equipment in the current subframe, and to receive the $B_{max}$ bits of ACK/NACK feedback information transmitted by the user equipment on a corresponding channel resource in the current subframe according to the determined number of bits of feedback information;

When the result of the judgment by the judging module 82 is $C_{real} \leq A-B_{max}$, to determine that $B_{max}$ bits of ACK/NACK feedback information and $C_{real}$ bits of CSI feedback information have been transmitted by the user equipment in the current subframe, and to receive the $B_{max}$ bits of ACK/NACK feedback information and the $C_{real}$ bits of CSI feedback information transmitted by the user equipment concurrently on a corresponding channel resource in the current subframe according to the determined numbers of bits of feedback information; and When the result of the judgment by the judging module 82 is other case, to determine that $C_{real}$ bits of CSI feedback information have been transmitted by the user equipment in the current subframe, to determine a number of bits of ACK/NACK feedback information transmitted by the user equipment as a number of bits of spatially-bundled ACK/NACK feedback information of all or a part of downlink carriers with multi-codeword transmission, and to receive the spatially-bundled ACK/NACK feedback information and the $C_{real}$ bits of CSI feedback information transmitted by the user equipment concurrently on a corresponding channel resource in the current subframe according to the determined numbers of bits of feedback information, where the number of bits of the spatially-bundled ACK/NACK feedback information does not exceed a value of $A-C_{real}$.

In another application scenario, when the judging module 82 judges the relationship between the maximum number $C_{type\_max}$ of feedback bits corresponding to the CSI reporting type of the downlink carrier, and A and $B_{min}$ and/or $B_{max}$, the processing module 83 is configured:

When a result of the judgment by the judging module 82 is $C_{type\_max}>A-B_{min}$, to determine that $B_{max}$ bits of ACK/NACK feedback information have been transmitted by the user equipment in the current subframe, and to receive the $B_{max}$ bits of ACK/NACK feedback information transmitted by the user equipment on a corresponding channel resource in the current subframe according to the determined number of bits of feedback information;

When the result of the judgment by the judging module 82 is $C_{type\_max} \leq A-B_{max}$, to determine that $B_{max}$ bits of ACK/NACK feedback information and $C_{type\_max}$ bits of CSI feedback information have been transmitted by the user equipment in the current subframe, and to receive the $B_{max}$ bits of ACK/NACK feedback information and the $C_{type\_max}$ bits of CSI feedback information transmitted by the user equipment concurrently on a corresponding channel resource in the current subframe according to the determined numbers of bits of feedback information; and When the result of the judgment by the judging module 82 is other case, to determine that $C_{type\_max}$ bits of CSI feedback information have been transmitted by the user equipment in the current subframe, to determine a number of bits of ACK/NACK feedback information transmitted by the user equipment in the current subframe as a number of bits of spatially-bundled ACK/NACK feedback information of all or a part of downlink carriers with multi-codeword transmission, and to receive the spatially-bundled ACK/NACK feedback information and the $C_{type\_max}$ bits of CSI feedback information transmitted by the user equipment concurrently on a corresponding channel resource in the current subframe according to the determined numbers of bits of feedback information, where the number of bits of the spatially-bundled ACK/NACK feedback information does not exceed a value of $A-C_{type\_max}$.

When the result of the judgment by the judging module 82 is $C_{type\_max} \leq A-B_{max}$ or the other case, the processing module 83 determines that $C_{type\_max}$ bits of CSI feedback information have been transmitted by the user equipment in the current subframe particularly as follows:

To determine that $C_{real}$ bits of CSI feedback information need to be generated by the user equipment; and If $C_{real}<C_{type\_max}$, to determine that the $C_{type\_max}$ bits of CSI feedback information include $(C_{type\_max}-C_{real})$ bits of placeholders and to determine first $C_{real}$ bits of information in the received $C_{type\_max}$ bits of CSI feedback information as real CSI feedback information of the downlink carrier; and If $C_{real}=C_{type\_max}$, to determine the $C_{type\_max}$ bits of CSI feedback information as real CSI feedback information of the downlink carrier.

It shall be noted that the judging module 82 is configured:

To select a downlink carrier with a highest priority CSI reporting type according to CSI reporting type priorities, where when there are a plurality of downlink carriers with the highest priority CSI reporting type, one of the plurality of carriers with the lowest carrier index is selected according to indexes of the carriers; or To select a downlink carrier with the lowest carrier index directly according to carrier indexes; or To determine a set of downlink carriers, for each of which the maximum number of feedback bits corresponding to the CSI reporting type does not exceed $(A-B_{min})$ bits, among downlink carriers with CSI feedback in the current subframe, and to select a downlink carrier with a highest priority CSI reporting type in the set of downlink carriers according to CSI reporting type priorities, where when there are a plurality of downlink carriers with the highest priority CSI reporting type in the set of downlink carriers, one of the plurality of carriers with the lowest carrier index is selected according to indexes of the carriers; or To determine a set of downlink carriers, for each of which the maximum number of feedback bits corresponding to the CSI reporting type does not exceed (A–$B_{min}$) bits, among downlink carriers with CSI feedback in the current subframe, and to select a downlink carrier with the lowest carrier index in the set of downlink carriers directly according to carrier indexes; or To determine a set of downlink carriers, for each of which the number of real feedback bits of the CSI reporting type does not exceed (A–$B_{min}$) bits, among downlink carriers with CSI feedback in the current subframe, and to select a downlink carrier with a highest priority CSI reporting type in the set of downlink carriers according to CSI reporting type priorities, where when there are a plurality of downlink carriers with the highest priority CSI reporting type in the set of downlink carriers, one of the plurality of carriers with the lowest carrier index is selected according to indexes of the carriers; or To determine a set of downlink carriers, for each of which the number of real feedback bits of the CSI reporting type does not exceed (A–$B_{min}$) bits, among downlink carriers with CSI feedback in the current subframe, and to select a downlink carrier with the lowest carrier index in the set of downlink carriers directly according to carrier indexes.

When the judging module 82 determines the set of downlink carriers, for each of which the maximum number of feedback bits corresponding to the CSI reporting type does not exceed (A–$B_{min}$) bits, among downlink carriers with CSI feedback in the current subframe, or when the judging module 82 determines the set of downlink carriers, for each of which the number of real feedback bits of the CSI reporting type does not exceed (A–$B_{min}$) bits, among downlink carriers with CSI feedback in the current subframe, the judging module 82 is configured:

To judge C>A–$B_{min}$ directly if the set of downlink carriers determined by the base station is a null set.

In another application scenario, the determining module 81 is further configured:

For a CSI reporting type of reporting based upon a Rank Indicator (RI) value, to determine the maximum number $C_{type\_max}$ of feedback bits corresponding to the CSI reporting type as the largest one of numbers of feedback bits, in the CSI reporting type, corresponding to different RI values in a current configuration; and For other CSI reporting types, to determine the maximum number $C_{type\_max}$ of feedback bits corresponding to the CSI reporting type as a number of real feedback bits.

When the current subframe is a sub-frame in which a Scheduling Request (SR) is transmitted, the processing module 83 is configured:

To receive the ACK/NACK feedback information and a 1-bit SR transmitted by the user equipment, or the ACK/NACK feedback information, the CSI feedback information and a 1-bit SR transmitted by the user equipment concurrently, or the spatially-bundled ACK/NACK feedback information, the CSI feedback information and a 1-bit SR transmitted by the user equipment concurrently, on the corresponding channel resource in the current subframe.

Furthermore the determining module 81 is configured to determine the threshold number A of bits as predefined or to determine and configure the user equipment with the threshold number A of bits via high-layer signaling or Physical Downlink Control Channel (PDCCH) signaling, where the value of A is any positive integer that does not exceed a maximum number of carrying bits in an uplink transmission scheme for transmitting ACK/NACK feedback information and CSI feedback information concurrently in the current subframe or any positive integer that does not exceed a difference between the maximum number of carrying bits in the uplink transmission scheme and a number of SR bits.

The technical solution according to the embodiment of the invention has the following advantages over the prior art:

By applying the technical solution of the embodiment of the invention, a method for transmitting ACK/NACK and periodic CSI concurrently on a corresponding channel resource in a current subframe is implemented, in which a mode in which ACK/NACK bits and CSI bits are transmitted concurrently in the current subframe is determined dynamically according to a maximum number of feedback bits of multiple types of UCI transmitted concurrently in the current subframe, and a maximum number of feedback bits and a minimum number of feedback bits of ACK/NACK in the current subframe, thereby ensuring that a total number of the concurrently transmitted UCI bits will not exceed the maximum number of feedback bits of multiple types of UCI transmitted concurrently in the current subframe (i.e., a maximum number of carrying bits of a PUCCH) and bundling of ACK/NACK and dropping of CSI can be avoided as much as possible to thereby guarantee accuracy and integrity of uplink information transmission maximally.

Those skilled in the art can clearly appreciate from the foregoing description of the embodiments that the embodiments of the invention can be implemented in hardware or in software plus a necessary general hardware platform. Based upon such understanding, the technical solutions of the embodiments of the invention can be embodied in the form of a program product which can be stored in a nonvolatile storage medium (e.g., a CD-ROM, a U disk, a mobile hard disk, etc.) and which includes several instructions to cause a computer device (e.g., a personal computer, a server, a network device, etc.) to perform the method according to the respective embodiments of the invention.

Those skilled in the art can appreciate that the drawings are merely a schematic diagram of preferred embodiments, and the module(s) or the flow(s) may not necessarily be required to implement the embodiments of the invention.

Those skilled in the art can appreciate that the modules in the devices of the embodiments can be distributed in the devices of the embodiments as described in the embodiments or located in one or more devices different from those of the embodiments given corresponding variations. The modules of the embodiments can be combined into one module or further subdivided into a plurality of sub-modules.

The embodiments of the invention have been numbered only for the sake of a convenient description but will not represent any superiority of one embodiment to another.

The foregoing disclosure is merely illustrative of several embodiments of the invention, but the embodiments of the invention will not be limited thereto, and any variations that can occur to those skilled in the art shall come into the claimed scope of the embodiments of the invention.

The invention claimed is:

1. A method for transmitting Uplink Control Information, UCI, wherein the method comprises:
  determining, by a user equipment, a minimum number $B_{min}$ of feedback bits and/or a maximum number $B_{max}$ of feedback bits of Acknowledgement, ACK/Non-Acknowledgement, NACK, in a current subframe;
  selecting, by the user equipment, a downlink carrier and judging a relationship between a number C of feedback bits for judgment corresponding to a Channel State Information, CSI, reporting type of the downlink carrier, and a threshold number A of concurrently transmitted UCI bits in the current subframe and $B_{min}$ and/or $B_{max}$;

when a result of the judgment by the user equipment is $C > A - B_{min}$, generating, by the user equipment, $B_{max}$ bits of ACK/NACK feedback information and transmitting the generated ACK/NACK feedback information on a corresponding channel resource in the current subframe;

when the result of the judgment by the user equipment is $C \leq A - B_{max}$, generating, by the user equipment, $B_{max}$ bits of ACK/NACK feedback information and C bits of CSI feedback information and transmitting the generated ACK/NACK feedback information and CSI feedback information concurrently on a corresponding channel resource in the current subframe;

when the result of the judgment by the user equipment is $C > A - B_{max}$ and $C \leq A - B_{min}$, generating, by the user equipment, C bits of CSI feedback information, spatially bundling ACK/NACK feedback information of all or a part of downlink carriers with multi-codeword transmission and transmitting the generated spatially-bundled ACK/NACK feedback information and CSI feedback information concurrently on a corresponding channel resource in the current subframe, wherein a number of bits of the spatially-bundled ACK/NACK feedback information does not exceed a value of A−C;

wherein determining, by the user equipment, the minimum number $B_{min}$ of feedback bits and/or the maximum number $B_{max}$ of feedback bits of ACK/NACK in the current subframe comprises:

determining, by the user equipment, $B_{min}$ according to a number N of configured carriers and a number $M_i$ of downlink subframes, on each carrier i, for which ACK/NACK needs to be fed back in the current subframe in accordance with the following equation:

$$B_{min} = \sum_{i=0}^{N-1} M_i;$$

and/or determining, by the user equipment, $B_{max}$ according to a number N of configured carriers, a transmission mode of each configured carrier and a number $M_i$ of downlink subframes, on each carrier i, for which ACK/NACK needs to be fed back in the current subframe in accordance with the following equation:

$$B_{max} = \sum_{i=0}^{N-1} C_i \cdot M_i;$$

wherein $C_i$ takes a value under the following rule:

for a carrier with single-codeword transmission, $C_i = 1$, and for a carrier with multi-codeword transmission, $C_i = 2$; or for a carrier with single-codeword transmission or for a carrier with multi-codeword transmission and spatial bundling, $C_i = 1$, and for a carrier with multi-codeword transmission and without spatial bundling, $C_i = 2$;

wherein $M_i$ represents the number of downlink subframes, on the carrier i, for which ACK/NACK needs to be fed back in the current subframe, and it takes a value under the following rule: for a Frequency Division Duplex, FDD, system, $M_i = 1$; and for a Time Division Duplex, TDD, system, $M_i$ corresponding to different aggregated carriers take the same or different values.

2. The method according to claim 1, wherein selecting, by the user equipment, a downlink carrier and judging the relationship between the number C of feedback bits for judgment corresponding to the CSI reporting type of the downlink carrier, and the threshold number A of concurrently transmitted UCI bits in the current subframe and $B_{max}$ and/or $B_{max}$ comprises:

selecting, by the user equipment, a downlink carrier and judging a relationship between a number $C_{real}$ of real feedback bits corresponding to the CSI reporting type of the downlink carrier, and A and $B_{min}$ and/or $B_{max}$; or selecting, by the user equipment, a downlink carrier and judging a relationship between a maximum number $C_{type\_max}$ of feedback bits corresponding to the CSI reporting type of the downlink carrier, and A and $B_{min}$ and/or $B_{max}$.

3. The method according to claim 2, wherein when the user equipment judges the relationship between the number $C_{real}$ of real feedback bits corresponding to the CSI reporting type of the downlink carrier, and A and $B_{min}$ and/or $B_{max}$, the method comprises:

when a result of the judgment by the user equipment is $C_{real} > A - B_{min}$, generating, by the user equipment, $B_{max}$ bits of ACK/NACK feedback information and transmitting the generated ACK/NACK feedback information on a corresponding channel resource in the current subframe;

when the result of the judgment by the user equipment is $C_{real} \leq A - B_{max}$, generating, by the user equipment, $B_{max}$ bits of ACK/NACK feedback information and $C_{real}$ bits of CSI feedback information and transmitting the generated ACK/NACK feedback information and CSI feedback information concurrently on a corresponding channel resource in the current subframe;

when the result of the judgment by the user equipment is $C_{real} > A - B_{max}$ and $C_{real} \leq A - B_{min}$ other case, generating, by the user equipment, $C_{real}$ bits of CSI feedback information, spatially bundling ACK/NACK feedback information of all or a part of downlink carriers with multi-codeword transmission, and transmitting the generated spatially-bundled ACK/NACK feedback information and CSI feedback information concurrently on a corresponding channel resource in the current subframe, wherein a number of bits of the spatially-bundled ACK/NACK feedback information does not exceed a value of $A - C_{real}$;

or when the user equipment judges the relationship between a maximum number $C_{type\_max}$ of feedback bits corresponding to the CSI reporting type of the downlink carrier, and A and $B_{min}$ and/or $B_{max}$, the method comprises:

when a result of the judgment by the user equipment is $C_{type\_max} > A - B_{min}$, generating, by the user equipment, $B_{max}$ bits of ACK/NACK feedback information and transmitting the generated $B_{max}$ bits of ACK/NACK feedback information on a corresponding channel resource in the current subframe;

when the result of the judgment by the user equipment is $C_{type\_max} \leq A - B_{max}$, generating, by the user equipment, $B_{max}$ bits of ACK/NACK feedback information and $C_{type\_max}$ bits of CSI feedback information and transmitting the generated $B_{max}$ bits of ACK/NACK feedback information and $C_{type\_max}$ bits of CSI feedback information concurrently on a corresponding channel resource in the current subframe;

when the result of the judgment by the user equipment is $C_{type\_max}>A-B_{max}$ and $C_{type\_max}\leq A-B_{min}$, generating, by the user equipment, $C_{type\_max}$ bits of CSI feedback information, spatially bundling ACK/NACK feedback information of all or a part of downlink carriers with multi-codeword transmission and transmitting the generated spatially-bundled ACK/NACK feedback information and $C_{type\_max}$ bits of CSI feedback information concurrently on a corresponding channel resource in the current subframe, wherein the number of bits of the spatially-bundled ACK/NACK feedback information does not exceed a value of $A-C_{type\_max}$;

wherein when the result of the judgment by the user equipment is $C_{type\_max}\leq A-B_{max}$, or $C_{type\_max}>A-B_{max}$ and $C_{type\_max}\leq A-B_{min}$, generating, by the user equipment, the $C_{type\_max}$ bits of CSI feedback information comprises:

generating, by the user equipment, $C_{real}$ bits of CSI feedback information;

if $C_{real}<C_{type\_max}$, then appending, by the user equipment, ($C_{type\_max}-C_{real}$) bits of placeholders to the $C_{real}$ bits of CSI feedback information and determining the CSI feedback information with appended placeholders as the $C_{type\_max}$ bits of CSI feedback information;

if $C_{real}=C_{type\_max}$, then determining, by the user equipment, the really generated $C_{real}$ bits of CSI feedback information as the $C_{type\_max}$ bits of CSI feedback information.

4. The method according to claim 1, wherein the user equipment selecting a downlink carrier comprises:

selecting, by the user equipment, a downlink carrier with a highest priority CSI reporting type according to CSI reporting type priorities, wherein when there are a plurality of downlink carriers with the highest priority CSI reporting type, one of the plurality of carriers with the lowest carrier index is selected according to indexes of the carriers; or selecting, by the user equipment, a downlink carrier with the lowest carrier index directly according to carrier indexes; or determining, by the user equipment, a set of downlink carriers, for each of which the maximum number of feedback bits corresponding to the CSI reporting type does not exceed ($A-B_{min}$) bits, among downlink carriers with CSI feedback in the current subframe, and selecting a downlink carrier with a highest priority CSI reporting type in the set of downlink carriers according to CSI reporting type priorities, wherein when there are a plurality of downlink carriers with the highest priority CSI reporting type in the set of downlink carriers, one of the plurality of carriers with the lowest carrier index is selected according to indexes of the carriers; or determining, by the user equipment, a set of downlink carriers, for each of which the maximum number of feedback bits corresponding to the CSI reporting type does not exceed ($A-B_{min}$) bits, among downlink carriers with CSI feedback in the current subframe, and selecting a downlink carrier with the lowest carrier index in the set of downlink carriers directly according to carrier indexes; or determining, by the user equipment, a set of downlink carriers, for each of which the number of real feedback bits of the CSI reporting type does not exceed ($A-B_{min}$) bits, among downlink carriers with CSI feedback in the current subframe, and selecting a downlink carrier with a highest priority CSI reporting type in the set of downlink carriers according to CSI reporting type priorities, wherein when there are a plurality of downlink carriers with the highest priority CSI reporting type in the set of downlink carriers, one of the plurality of carriers with the lowest carrier index is selected according to indexes of the carriers; or determining, by the user equipment, a set of downlink carriers, for each of which the number of real feedback bits of the CSI reporting type does not exceed ($A-B_{min}$) bits, among downlink carriers with CSI feedback in the current subframe, and selecting a downlink carrier with the lowest carrier index in the set of downlink carriers directly according to carrier indexes;

and/or when the user equipment determines the set of downlink carriers, for each of which the maximum number of feedback bits corresponding to the CSI reporting type does not exceed ($A-B_{min}$) bits, among downlink carriers with CSI feedback in the current subframe, or when the user equipment determines the set of downlink carriers, for each of which the number of real feedback bits of the CSI reporting type does not exceed ($A-B_{min}$) bits, among downlink carriers with CSI feedback in the current subframe, the method further comprises:

judging, by the user equipment, $C>A-B_{min}$ directly if the set of downlink carriers determined by the user equipment is a null set.

5. The method according to claim 2, wherein the maximum number $C_{type\_max}$ of feedback bits corresponding to the CSI reporting type is:

for a CSI reporting type of reporting based upon a Rank Indicator, RI, value, the maximum number $C_{type\_max}$ of feedback bits corresponding to the CSI reporting type is a largest one of numbers of feedback bits, in the CSI reporting type, corresponding to different RI values in a current configuration;

for other CSI reporting types, the maximum number $C_{type\_max}$ of feedback bits corresponding to the CSI reporting type is a number of real feedback bits.

6. The method according to claim 1, wherein when the current subframe is a sub-frame in which a Scheduling Request, SR, is transmitted, the user equipment transmitting the generated ACK/NACK feedback information, or the generated ACK/NACK feedback information and CSI feedback information concurrently, or the generated spatially-bundled ACK/NACK feedback information and CSI feedback information concurrently, on the corresponding channel resource in the current subframe comprises:

transmitting, by the user equipment, the generated ACK/NACK feedback information and a 1-bit SR, or the generated ACK/NACK feedback information and CSI feedback information and a 1-bit SR concurrently, or the generated spatially-bundled ACK/NACK feedback information and CSI feedback information and a 1-bit SR concurrently, on the corresponding channel resource in the current subframe.

7. The method according to claim 1, wherein the threshold number A of bits is a predefined value or a value signaled via high-layer signaling or Physical Downlink Control Channel, PDCCH, signaling, and wherein the value of A is any positive integer that does not exceed a maximum number of carrying bits in an uplink transmission scheme for transmitting ACK/NACK feedback information and CSI feedback information concurrently in the current subframe, or any positive integer that does not exceed a difference between the maximum number of carrying bits in the uplink transmission scheme and a number of SR bits.

8. A user equipment, comprising:
circuitry configured to implement a determining module, a judging module and a processing module,
the determining module configured to determine a minimum number $B_{min}$ of feedback bits and/or a maximum number $B_{max}$ of feedback bits of ACK/NACK in a current subframe;
the judging module configured to select a downlink carrier and to judge a relationship between a number C of feedback bits for judgment corresponding to a CSI reporting type of the downlink carrier, and a threshold number A of concurrently transmitted UCI bits in the current subframe and $B_{min}$ and/or $B_{max}$;
the processing module configured, when a result of the judgment by the judging module is $C>A-B_{min}$, to generate $B_{max}$ bits of ACK/NACK feedback information and to transmit the generated ACK/NACK feedback information on a corresponding channel resource in the current subframe;
when the result of the judgment by the judging module is $C \leq A-B_{max}$, to generate $B_{max}$ bits of ACK/NACK feedback information and C bits of CSI feedback information and to transmit the generated ACK/NACK feedback information and CSI feedback information concurrently on a corresponding channel resource in the current subframe;
when the result of the judgment by the judging module is $C>A-B_{max}$ and $C \leq A-B_{min}$, to generate C bits of CSI feedback information, to spatially bundle ACK/NACK feedback information of all or a part of downlink carriers with multi-codeword transmission and to transmit the generated spatially-bundled ACK/NACK feedback information and CSI feedback information concurrently on a corresponding channel resource in the current subframe, wherein a number of bits of the spatially-bundled ACK/NACK feedback information does not exceed a value of A–C;
wherein the determining module is configured:
to determine $B_{min}$ according to a number N of configured carriers and a number $M_i$ of downlink subframes, on each carrier i, for which ACK/NACK needs to be fed back in the current subframe in accordance with the following equation:

$$B_{min} = \sum_{i=0}^{N-1} M_i;$$

and/or
to determine $B_{max}$ according to a number N of configured carriers, a transmission mode of each configured carrier and a number $M_i$ of downlink subframes, on each carrier i, for which ACK/NACK needs to be fed back in the current subframe in accordance with the following equation:

$$B_{max} = \sum_{i=0}^{N-1} C_i \cdot M_i;$$

wherein $C_i$ takes a value under the following rule:
for a carrier with single-codeword transmission, $C_i=1$, and for a carrier with multi-codeword transmission, $C_i=2$;
or
for a carrier with single-codeword transmission or for a carrier with multi-codeword transmission and spatial bundling, $C_i=1$, and for a carrier with multi-codeword transmission and without spatial bundling, $C_i=2$;
wherein $M_i$ represents the number of downlink subframes, on the carrier i, for which ACK/NACK needs to be fed back in the current subframe, and it takes a value under the following rule: for a Frequency Division Duplex, FDD, system, $M_i=1$; and for a Time Division Duplex, TDD, system, $M_i$ corresponding to different aggregated carriers take the same or different values.

9. The user equipment according to claim 8, wherein the judging module is configured:
to select a downlink carrier and to judge a relationship between a number $C_{real}$ of real feedback bits corresponding to the CSI reporting type of the downlink carrier, and A and $B_{min}$ and/or $B_{max}$; or
to select a downlink carrier and to judge a relationship between a maximum number $C_{type\_max}$ of feedback bits corresponding to the CSI reporting type of the downlink carrier, and A and $B_{min}$ and/or $B_{max}$.

10. The user equipment according to claim 9, wherein when the judging module judges the relationship between the number $C_{real}$ of real feedback bits corresponding to the CSI reporting type of the downlink carrier, and A and $B_{min}$ and/or $B_{max}$, the processing module is configured:
when a result of the judgment by the judging module is $C_{real}>A-B_{min}$, to generate $B_{max}$ bits of ACK/NACK feedback information and to transmit the generated ACK/NACK feedback information on a corresponding channel resource in the current subframe;
when the result of the judgment by the judging module is $C_{real} \leq A-B_{max}$, to generate $B_{max}$ bits of ACK/NACK feedback information and $C_{real}$ bits of CSI feedback information and to transmit the generated ACK/NACK feedback information and CSI feedback information concurrently on a corresponding channel resource in the current subframe;
when the result of the judgment by the judging module is $C_{real}>A-B_{max}$ and $C_{real} \leq A-B_{min}$, to generate $C_{real}$ bits of CSI feedback information, to spatially bundle ACK/NACK feedback information of all or a part of downlink carriers with multi-codeword transmission and to transmit the generated spatially-bundled ACK/NACK feedback information and CSI feedback information concurrently on a corresponding channel resource in the current subframe, wherein a number of bits of the spatially-bundled ACK/NACK feedback information does not exceed a value of A–$C_{real}$;
or
when the judging module judges the relationship between the maximum number $C_{type\_max}$ of feedback bits corresponding to the CSI reporting type of the downlink carrier, and A and $B_{min}$ and/or $B_{max}$, the processing module is configured:
when a result of the judgment by the judging module is $C_{type\_max}>A-B_{min}$, to generate $B_{max}$ bits of ACK/NACK feedback information and to transmit the generated $B_{max}$ bits of ACK/NACK feedback information on a corresponding channel resource in the current subframe;
when the result of the judgment by the judging module is $C_{type\_max} \leq A-B_{max}$, to generate $B_{max}$ bits of ACK/

NACK feedback information and $C_{type\_max}$ bits of CSI feedback information and to transmit the generated $B_{max}$ bits of ACK/NACK feedback information and $C_{type\_max}$ bits of CSI feedback information concurrently on a corresponding channel resource in the current subframe;

when the result of the judgment by the judging module is $C_{type\_max}>A-B_{max}$ and $C_{type\_max}\leq A-B_{min}$, to generate $C_{type\_max}$ bits of CSI feedback information, to spatially bundle ACK/NACK feedback information of all or a part of downlink carriers with multi-codeword transmission and to transmit the generated spatially-bundled ACK/NACK feedback information and $C_{type\_max}$ bits of CSI feedback information concurrently on a corresponding channel resource in the current subframe, wherein a number of bits of the spatially-bundled ACK/NACK feedback information does not exceed a value of $A-C_{type\_max}$;

wherein when the result of the judgment by the judging module is $C_{type\_max}\leq A-B_{max}$, or $C_{type\_max}>A-B_{max}$ and $C_{type\_max}\leq A-B_{min}$, the processing module configured to generate the $C_{type\_max}$ bits of CSI feedback information is configured:

to generate $C_{real}$ bits of CSI feedback information;

if $C_{real}<C_{type\_max}$, to append ($C_{type\_max}-C_{real}$) bits of placeholders to the $C_{real}$ bits of CSI feedback information and to determine the CSI feedback information with appended placeholders as the $C_{type\_max}$ bits of CSI feedback information;

if $C_{real}=C_{type\_max}$, to determine the really generated $C_{real}$ bits of CSI feedback information as the $C_{type\_max}$ bits of CSI feedback information;

and/or the determining module is further configured:

for a CSI reporting type of reporting based upon a Rank Indicator, RI, value, to determine the maximum number $C_{type\_max}$ of feedback bits corresponding to the CSI reporting type as a largest one of numbers of feedback bits, in the CSI reporting type, corresponding to different RI values in a current configuration;

for other CSI reporting types, to determine the maximum number $C_{type\_max}$ of feedback bits corresponding to the CSI reporting type as a number of real feedback bits.

11. The user equipment according to claim 8, wherein the judging module is configured:

to select a downlink carrier with a highest priority CSI reporting type according to CSI reporting type priorities, wherein when there are a plurality of downlink carriers with the highest priority CSI reporting type, one of the plurality of carriers with the lowest carrier index is selected according to indexes of the carriers; or to select a downlink carrier with the lowest carrier index directly according to carrier indexes; or to determine a set of downlink carriers, for each of which the maximum number of feedback bits corresponding to the CSI reporting type does not exceed ($A-B_{min}$) bits, among downlink carriers with CSI feedback in the current subframe, and to select a downlink carrier with a highest priority CSI reporting type in the set of downlink carriers according to CSI reporting type priorities, wherein when there are a plurality of downlink carriers with the highest priority CSI reporting type in the set of downlink carriers, one of the plurality of carriers with the lowest carrier index is selected according to indexes of the carriers; or to determine a set of downlink carriers, for each of which the maximum number of feedback bits corresponding to the CSI reporting type does not exceed ($A-B_{min}$) bits, among downlink carriers with CSI feedback in the current subframe, and to select a downlink carrier with the lowest carrier index in the set of downlink carriers directly according to carrier indexes; or to determine a set of downlink carriers, for each of which the number of real feedback bits of the CSI reporting type does not exceed ($A-B_{min}$) bits, among downlink carriers with CSI feedback in the current subframe, and to select a downlink carrier with a highest priority CSI reporting type in the set of downlink carriers according to CSI reporting type priorities, wherein when there are a plurality of downlink carriers with the highest priority CSI reporting type in the set of downlink carriers, one of the plurality of carriers with the lowest carrier index is selected according to indexes of the carriers; or to determine a set of downlink carriers, for each of which the number of real feedback bits of the CSI reporting type does not exceed ($A-B_{min}$) bits, among downlink carriers with CSI feedback in the current subframe, and to select a downlink carrier with the lowest carrier index in the set of downlink carriers directly according to carrier indexes;

and/or when the judging module determines the set of downlink carriers, for each of which the maximum number of feedback bits corresponding to the CSI reporting type does not exceed ($A-B_{min}$) bits, among downlink carriers with CSI feedback in the current subframe, or when the judging module determines the set of downlink carriers, for each of which the number of real feedback bits of the CSI reporting type does not exceed ($A-B_{min}$) bits, among downlink carriers with CSI feedback in the current subframe, the judging module is configured:

to judge $C>A-B_{min}$ directly if the set of downlink carriers determined by the judging module is a null set;

and/or wherein when the current subframe is a sub-frame in which a Scheduling Request, SR, is transmitted, the processing module is configured:

to transmit the generated ACK/NACK feedback information and a 1-bit SR, or the generated ACK/NACK feedback information and CSI feedback information and a 1-bit SR concurrently, or the generated spatially-bundled ACK/NACK feedback information and CSI feedback information and a 1-bit SR concurrently, on the corresponding channel resource in the current subframe;

and/or the determining module is further configured to determine the threshold number A of bits as predefined or from configuration information obtained via high-layer signaling or Physical Downlink Control Channel, PDCCH, signaling, wherein the value of A is any positive integer that does not exceed a maximum number of carrying bits in an uplink transmission scheme for transmitting ACK/NACK feedback information and CSI feedback information concurrently in the current subframe, or any positive integer that does not exceed a difference between the maximum number of carrying bits in the uplink transmission scheme and a number of SR bits.

12. A method for transmitting Uplink Control Information, UCI, wherein the method comprises:

determining, by a base station, a minimum number $B_{min}$ of feedback bits and/or a maximum number $B_{max}$ of feedback bits of ACK/NACK, fed back by a user equipment, in a current subframe;

selecting, by the base station, a downlink carrier and judging a relationship between a number C of feedback bits for judgment corresponding to a CSI reporting type of the downlink carrier, and a threshold number A of concurrently transmitted UCI bits in the current subframe and $B_{min}$ and/or $B_{max}$;

when a result of the judgment by the base station is $C>A-B_{min}$, determining, by the base station, that $B_{max}$ bits of ACK/NACK feedback information have been transmitted by the user equipment in the current subframe and receiving the ACK/NACK feedback information transmitted by the user equipment on a corresponding channel resource in the current subframe according to the determined number of bits of feedback information;

when the result of the judgment by the base station is $C \leq A-B_{max}$, determining, by the base station, that $B_{max}$ bits of ACK/NACK feedback information and C bits of CSI feedback information have been transmitted by the user equipment in the current subframe and receiving the ACK/NACK feedback information and the CSI feedback information transmitted by the user equipment concurrently on a corresponding channel resource in the current subframe according to the determined numbers of bits of feedback information;

when the result of the judgment by the base station is $C>A-B_{max}$ and $C \leq A-B_{min}$, determining, by the base station, that C bits of CSI feedback information have been transmitted by the user equipment in the current subframe, determining a number of bits of ACK/NACK feedback information transmitted by the user equipment in the current subframe as a number of bits of spatially-bundled ACK/NACK feedback information of all or a part of downlink carriers with multi-codeword transmission, and receiving the spatially-bundled ACK/NACK feedback information and the CSI feedback information transmitted by the user equipment concurrently on a corresponding channel resource in the current subframe according to the determined numbers of bits of feedback information, wherein the number of bits of spatially-bundled ACK/NACK feedback information does not exceed a value of A−C;

wherein determining, by the base station, the minimum number $B_{min}$ of feedback bits and/or the maximum number $B_{max}$ of feedback bits of ACK/NACK, fed back by the user equipment, in the current subframe comprises:

determining, by the base station, $B_{min}$ according to a number N of configured carriers corresponding to the user equipment and a number $M_i$ of downlink subframes, on each carrier i, for which ACK/NACK needs to be fed back in the current subframe in accordance with the following equation:

$$B_{min} = \sum_{i=0}^{N-1} M_i;$$

and/or determining, by the base station, $B_{max}$ according to a number N of configured carriers corresponding to the user equipment, a transmission mode of each configured carrier and a number $M_i$ of downlink subframes, on each carrier i, for which ACK/NACK needs to be fed back in the current subframe in accordance with the following equation:

$$B_{max} = \sum_{i=0}^{N-1} C_i \cdot M_i;$$

wherein $C_i$ takes a value under the following rule:

for a carrier with single-codeword transmission, $C_i=1$, and for a carrier with multi-codeword transmission, $C_i=2$; or for a carrier with single-codeword transmission or for a carrier with multi-codeword transmission and spatial bundling, $C_i=1$, and for a carrier with multi-codeword transmission and without spatial bundling, $C_i=2$;

wherein $M_i$ represents the number of downlink subframes, on the carrier i, for which ACK/NACK needs to be fed back in the current subframe, and it takes a value under the following rule: for an FDD system, $M_i=1$; and for a TDD system, $M_i$ corresponding to different aggregated carriers take the same or different values.

13. The method according to claim 12, wherein selecting, by the base station, a downlink carrier and judging the relationship between the number C of feedback bits for judgment corresponding to the CSI reporting type of the downlink carrier, and the threshold number A of concurrently transmitted UCI bits in the current subframe and $B_{min}$ and/or $B_{max}$ comprises:

selecting, by the base station, a downlink carrier and judging a relationship between a number $C_{real}$ of real feedback bits corresponding to the CSI reporting type of the downlink carrier, and A and $B_{min}$ and/or $B_{max}$; or selecting, by the base station, a downlink carrier and judging a relationship between a maximum number $C_{type\_max}$ of feedback bits corresponding to the CSI reporting type of the downlink carrier, and A and $B_{min}$ and/or $B_{max}$.

14. The method according to claim 13, wherein when the base station judges the relationship between the number $C_{real}$ of real feedback bits corresponding to the CSI reporting type of the downlink carrier, and A and $B_{min}$ and/or $B_{max}$, the method comprises:

when a result of the judgment by the base station is $C_{real}>A-B_{min}$, determining, by the base station, that $B_{max}$ bits of ACK/NACK feedback information have been transmitted by the user equipment in the current subframe and receiving the $B_{max}$ bits of ACK/NACK feedback information transmitted by the user equipment on a corresponding channel resource in the current subframe according to the determined number of bits of feedback information;

when the result of the judgment by the base station is $C_{real} \leq A-B_{max}$, determining, by the base station, that $B_{max}$ bits of ACK/NACK feedback information and $C_{real}$ bits of CSI feedback information have been transmitted by the user equipment in the current subframe, and receiving the $B_{max}$ bits of ACK/NACK feedback information and the $C_{real}$ bits of CSI feedback information transmitted by the user equipment concurrently on a corresponding channel resource in the current subframe according to the determined numbers of bits of feedback information;

when the result of the judgment by the base station is $C_{real}>A-B_{max}$ and $C_{real} \leq A-B_{min}$, determining, by the base station, that $C_{real}$ bits of CSI feedback information have been transmitted by the user equipment in the current subframe, determining a number of bits of ACK/NACK feedback information transmitted by the user equipment as a number of bits of spatially-bundled ACK/NACK feedback information of all or a part of downlink carriers with multi-codeword transmission, and receiving the spatially-bundled ACK/NACK feedback information and the $C_{real}$ bits of CSI feedback information transmitted by the user equipment concurrently on a corresponding channel resource in the current subframe according to the determined numbers of bits of feedback information, wherein the number of bits of the spatially-bundled ACK/NACK feedback information does not exceed a value of A−$C_{real}$;

or when the base station judges the relationship between the maximum number $C_{type\_max}$ of feedback bits corresponding to the CSI reporting type of the downlink carrier, and A and $B_{min}$ and/or $B_{max}$, the method comprises:

when a result of the judgment by the base station is $C_{type\_max}$>A−$B_{min}$, determining, by the base station, that $B_{max}$ bits of ACK/NACK feedback information have been transmitted by the user equipment in the current subframe and receiving the $B_{max}$ bits of ACK/NACK feedback information transmitted by the user equipment on a corresponding channel resource in the current subframe according to the determined number of bits of feedback information;

when the result of the judgment by the base station is $C_{type\_max}$≤A−$B_{max}$, determining, by the base station, that $B_{max}$ bits of ACK/NACK feedback information and $C_{type\_max}$ bits of CSI feedback information have been transmitted by the user equipment in the current subframe, and receiving the $B_{max}$ bits of ACK/NACK feedback information and the $C_{type\_max}$ bits of CSI feedback information transmitted by the user equipment concurrently on a corresponding channel resource in the current subframe according to the determined numbers of bits of feedback information;

when the result of the judgment by the base station is $C_{type\_max}$>A−$B_{max}$ and $C_{type\_max}$≤A−$B_{min}$, determining, by the base station, that $C_{type\_max}$ bits of CSI feedback information have been transmitted by the user equipment in the current subframe, determining a number of bits of ACK/NACK feedback information transmitted by the user equipment in the current subframe as a number of bits of spatially-bundled ACK/NACK feedback information of all or a part of downlink carriers with multi-codeword transmission, and receiving the spatially-bundled ACK/NACK feedback information and the $C_{type\_max}$ bits of CSI feedback information transmitted by the user equipment concurrently on a corresponding channel resource in the current subframe according to the determined numbers of bits of feedback information, wherein the number of bits of the spatially-bundled ACK/NACK feedback information does not exceed a value of A−$C_{type\_max}$;

wherein when the result of the judgment by the base station is $C_{type\_max}$≤A−$B_{max}$, or $C_{type\_max}$<A−$B_{max}$ and $C_{type\_max}$≤A−$B_{min}$, determining, by the base station, that the $C_{type\_max}$ bits of CSI feedback information have been transmitted by the user equipment in the current subframe comprises:

determining, by the base station, that $C_{real}$ bits of CSI feedback information need to be generated by the user equipment;

if $C_{real}$<$C_{type\_max}$, determining, by the base station, that the $C_{type\_max}$ bits of CSI feedback information comprise ($C_{type\_max}$−$C_{real}$) bits of placeholders and determining first $C_{real}$ bits of information in the received $C_{type\_max}$ bits of CSI feedback information as real CSI feedback information of the downlink carrier;

if $C_{real}$=$C_{type\_max}$, determining, by the base station, the $C_{type\_max}$ bits of CSI feedback information as real CSI feedback information of the downlink carrier;

and/or determining, by the base station, the maximum number $C_{type\_max}$ of feedback bits corresponding to the CSI reporting type comprises:

for a CSI reporting type of reporting based upon a RI value, the maximum number $C_{type\_max}$ of feedback bits corresponding to the CSI reporting type is a largest one of numbers of feedback bits, in the CSI reporting type, corresponding to different RI values in a current configuration;

for other CSI reporting types, the maximum number $C_{type\_max}$ of feedback bits corresponding to the CSI reporting type is a number of real feedback bits.

15. The method according to claim 12, wherein selecting, by the base station, a downlink carrier comprises:

selecting, by the base station, a downlink carrier with a highest priority CSI reporting type according to CSI reporting type priorities, wherein when there are a plurality of downlink carriers with the highest priority CSI reporting type, one of the plurality of carriers with the lowest carrier index is selected according to indexes of the carriers; or selecting, by the base station, a downlink carrier with the lowest carrier index directly according to carrier indexes; or determining, by the base station, a set of downlink carriers, for each of which the maximum number of feedback bits corresponding to the CSI reporting type does not exceed (A−$B_{min}$) bits, among downlink carriers with CSI feedback in the current subframe, and selecting a downlink carrier with a highest priority CSI reporting type in the set of downlink carriers according to CSI reporting type priorities, wherein when there are a plurality of downlink carriers with the highest priority CSI reporting type in the set of downlink carriers, one of the plurality of carriers with the lowest carrier index is selected according to indexes of the carriers; or determining, by the base station, a set of downlink carriers, for each of which the maximum number of feedback bits corresponding to the CSI reporting type does not exceed (A−$B_{min}$) bits, among downlink carriers with CSI feedback in the current subframe, and selecting a downlink carrier with the lowest carrier index in the set of downlink carriers directly according to carrier indexes; or determining, by the base station, a set of downlink carriers, for each of which the number of real feedback bits of the CSI reporting type does not exceed (A−$B_{min}$) bits, among downlink carriers with CSI feedback in the current subframe, and selecting a downlink carrier with a highest priority CSI reporting type in the set of downlink carriers according to CSI reporting type priorities, wherein when there are a plurality of downlink carriers with the highest priority CSI reporting type in the set of downlink carriers, one of the plurality of carriers with the lowest carrier index is selected according to indexes of the carriers; or determining, by the base station, a set of downlink carriers, for each of which the number of real feedback bits of the CSI reporting type does not exceed $(A-B_{min})$ bits, among downlink carriers with CSI feedback in the current subframe, and selecting a downlink carrier with the lowest carrier index in the set of downlink carriers directly according to carrier indexes;

and/or when the base station determines the set of downlink carriers, for each of which the maximum number of feedback bits corresponding to the CSI reporting type does not exceed $(A-B_{min})$ bits, among downlink carriers with CSI feedback in the current subframe, or when the base station determines the set of downlink carriers, for each of which the number of real feedback bits of the CSI reporting type does not exceed $(A-B_{min})$ bits, among downlink carriers with CSI feedback in the current subframe, the method comprises:

judging, by the base station, $C>A-B_{min}$ directly if the set of downlink carriers determined by the base station is a null set;

and/or wherein when the current subframe is a sub-frame in which a Scheduling Request, SR, is transmitted, receiving, by the base station, the ACK/NACK feedback information transmitted by the user equipment, or the ACK/NACK feedback information and the CSI feedback information transmitted by the user equipment concurrently, or the spatially-bundled ACK/NACK feedback information and the CSI feedback information transmitted by the user equipment concurrently, on the corresponding channel resource in the current subframe comprises:

receiving, by the base station, the ACK/NACK feedback information and a 1-bit SR transmitted by the user equipment, or the ACK/NACK feedback information, the CSI feedback information and a 1-bit SR transmitted by the user equipment concurrently, or the spatially-bundled ACK/NACK feedback information, the CSI feedback information and a 1-bit SR transmitted by the user equipment concurrently, on the corresponding channel resource in the current subframe;

and/or determining, by the base station, the threshold number A of bits comprises:

the threshold number A of bits is predefined or is determined by the base station and signaled to the user equipment via high-layer signaling or Physical Downlink Control Channel, PDCCH, signaling, wherein the value of A is any positive integer that does not exceed a maximum number of carrying bits in an uplink transmission scheme for transmitting ACK/NACK feedback information and CSI feedback information concurrently in the current subframe or any positive integer that does not exceed a difference between the maximum number of carrying bits in the uplink transmission scheme and a number of SR bits.

16. A base station, comprising:

circuitry configured to implement a determining module, a judging module and a processing module, the determining module configured to determine a minimum number $B_{min}$ of feedback bits and/or a maximum number $B_{max}$ of feedback bits of ACK/NACK, fed back by a user equipment, in a current subframe;

the judging module configured to select a downlink carrier and to judge a relationship between a number C of feedback bits for judgment corresponding to a CSI reporting type of the downlink carrier, and a threshold number A of concurrently transmitted UCI bits in the current subframe and $B_{min}$ and/or $B_{max}$;

the processing module configured, when a result of the judgment by the judging module is $C>A-B_{min}$, to determine that $B_{max}$ bits of ACK/NACK feedback information have been transmitted by the user equipment in the current subframe, and to receive the ACK/NACK feedback information transmitted by the user equipment on a corresponding channel resource in the current subframe according to the determined number of bits of feedback information;

when the result of the judgment by the judging module is $C \le A-B_{max}$, to determine that $B_{max}$ bits of ACK/NACK feedback information and C bits of CSI feedback information have been transmitted by the user equipment in the current subframe, and to receive the ACK/NACK feedback information and the CSI feedback information transmitted by the user equipment concurrently on a corresponding channel resource in the current subframe according to the determined numbers of bits of feedback information;

when the result of the judgment by the judging module is $C>A-B_{max}$ and $C \le A-B_{min}$, to determine that C bits of CSI feedback information have been transmitted by the user equipment in the current subframe, to determine a number of bits of ACK/NACK feedback information transmitted by the user equipment in the current subframe as a number of bits of spatially-bundled ACK/NACK feedback information of all or a part of downlink carriers with multi-codeword transmission, and to receive the spatially-bundled ACK/NACK feedback information and the CSI feedback information transmitted by the user equipment concurrently on a corresponding channel resource in the current subframe according to the determined numbers of bits of feedback information;

wherein the determining module is configured:

to determine $B_{min}$ according to a number N of configured carriers corresponding to the user equipment and a number $M_i$ of downlink subframes, on each carrier i, for which ACK/NACK needs to be fed back in the current subframe in accordance with the following equation:

$$B_{min} = \sum_{i=0}^{N-1} M_i;$$

and/or to determine $B_{max}$ according to a number N of configured carriers corresponding to the user equipment, a transmission mode of each configured carrier and a number $M_i$ of downlink subframes, on each carrier i, for which ACK/NACK needs to be fed back in the current subframe in accordance with the following equation of:

$$B_{max} = \sum_{i=0}^{N-1} C_i \cdot M_i;$$

wherein $C_i$ takes a value under the following rule:

for a carrier with single-codeword transmission, $C_i=1$, and for a carrier with multi-codeword transmission, $C_i=2$;

or for a carrier with single-codeword transmission or for a carrier with multi-codeword transmission and spatial bundling, $C_i=1$, and for a carrier with multi-codeword transmission and without spatial bundling, $C_i=2$;

wherein $M_i$ represents the number of downlink subframes, on the carrier i, for which ACK/NACK needs to be fed back in the current subframe, and it takes a value under the following rule: for an FDD system, $M_i=1$; and for a TDD system, $M_i$ corresponding to different aggregated carriers take the same or different values.

17. The base station according to claim 16, wherein the judging module is configured:

to select a downlink carrier and to judge a relationship between a number $C_{real}$ of real feedback bits corresponding to the CSI reporting type of the downlink carrier, and A and $B_{min}$ and/or $B_{max}$; or to select a downlink carrier and to judge a relationship between the maximum number $C_{type\_max}$ of feedback bits corresponding to the CSI reporting type of the downlink carrier, and A and $B_{min}$ and/or $B_{max}$.

18. The base station according to claim 17, wherein when the judging module judges the relationship between the number $C_{real}$ of real feedback bits corresponding to the CSI reporting type of the downlink carrier, and A and $B_{min}$ and/or $B_{max}$, the processing module is configured:

when a result of the judgment by the judging module is $C_{real}>A-B_{min}$, to determine that $B_{max}$ bits of ACK/NACK feedback information have been transmitted by the user equipment in the current subframe, and to receive the $B_{max}$ bits of ACK/NACK feedback information transmitted by the user equipment on a corresponding channel resource in the current subframe according to the determined number of bits of feedback information;

when the result of the judgment by the judging module is $C_{real}\leq A-B_{max}$, to determine that $B_{max}$ bits of ACK/NACK feedback information and $C_{real}$ bits of CSI feedback information have been transmitted by the user equipment in the current subframe, and to receive the $B_{max}$ bits of ACK/NACK feedback information and the $C_{real}$ bits of CSI feedback information transmitted by the user equipment concurrently on a corresponding channel resource in the current subframe according to the determined numbers of bits of feedback information;

when the result of the judgment by the judging module is $C_{real}>A-B_{max}$ and $C_{real}\leq A-B_{min}$, to determine that $C_{real}$ bits of CSI feedback information have been transmitted by the user equipment in the current subframe, to determine a number of bits of ACK/NACK feedback information transmitted by the user equipment as a number of bits of spatially-bundled ACK/NACK feedback information of all or a part of downlink carriers with multi-codeword transmission, and to receive the spatially-bundled ACK/NACK feedback information and the $C_{real}$ bits of CSI feedback information transmitted by the user equipment concurrently on a corresponding channel resource in the current subframe according to the determined numbers of bits of feedback information, wherein the number of bits of the spatially-bundled ACK/NACK feedback information does not exceed a value of $A-C_{real}$;

or when the judging module judges the relationship between the maximum number $C_{type\_max}$ of feedback bits corresponding to the CSI reporting type of the downlink carrier, and A and $B_{min}$ and/or $B_{max}$, the processing module is configured:

when a result of the judgment by the judging module is $C_{type\_max}>A-B_{min}$, to determine that $B_{max}$ bits of ACK/NACK feedback information have been transmitted by the user equipment in the current subframe, and to receive the $B_{max}$ bits of ACK/NACK feedback information transmitted by the user equipment on a corresponding channel resource in the current subframe according to the determined number of bits of feedback information;

when the result of the judgment by the judging module is $C_{type\_max}\leq A-B_{max}$, to determine that $B_{max}$ bits of ACK/NACK feedback information and $C_{type\_max}$ bits of CSI feedback information have been transmitted by the user equipment in the current subframe and to receive the $B_{max}$ bits of ACK/NACK feedback information and the $C_{type\_max}$ bits of CSI feedback information transmitted by the user equipment concurrently on a corresponding channel resource in the current subframe according to the determined numbers of bits of feedback information;

when the result of the judgment by the judging module is $C_{type\_max}>A-B_{max}$ and $C_{type\_max}\leq A-B_{min}$, to determine that $C_{type\_max}$ bits of CSI feedback information have been transmitted by the user equipment in the current subframe, to determine a number of bits of ACK/NACK feedback information transmitted by the user equipment in the current subframe as a number of bits of spatially-bundled ACK/NACK feedback information of all or a part of downlink carriers with multi-codeword transmission and to receive the spatially-bundled ACK/NACK feedback information and the $C_{type\_max}$ bits of CSI feedback information transmitted by the user equipment concurrently on a corresponding channel resource in the current subframe according to the determined numbers of bits of feedback information, wherein the number of bits of the spatially-bundled ACK/NACK feedback information does not exceed a value of $A-C_{type\_max}$;

wherein when the result of the judgment by the judging module is $C_{type\_max}\leq A-B_{max}$, or $C_{type\_max}>A-B_{max}$ and $C_{type\_max}\leq A-B_{min}$, the processing module configured to determine that the $C_{type\_max}$ bits of CSI feedback information have been transmitted by the user equipment in the current subframe is configured:

to determine that $C_{real}$ bits of CSI feedback information need to be generated by the user equipment;

if $C_{real}<C_{type\_max}$, to determine that the $C_{type\_max}$ bits of CSI feedback information comprise $(C_{type\_max}-C_{real})$ bits of placeholders and to determine first $C_{real}$ bits of information in the received $C_{type\_max}$ bits of CSI feedback information as real CSI feedback information of the downlink carrier;

if $C_{real}=C_{type\_max}$, to determine the $C_{type\_max}$ bits of CSI feedback information as real CSI feedback information of the downlink carrier;

and/or the determining module is configured:

for a CSI reporting type of reporting based upon a RI value, to determine the maximum number $C_{type\_max}$ of feedback bits corresponding to the CSI reporting type as a largest one of numbers of feedback bits, in the CSI reporting type, corresponding to different RI values in a current configuration;

for other CSI reporting types, to determine the maximum number $C_{type\_max}$ of feedback bits corresponding to the CSI reporting type as a number of real feedback bits.

19. The base station according to claim 16, wherein the judging module is configured:

to select a downlink carrier with a highest priority CSI reporting type according to CSI reporting type priorities, wherein when there are a plurality of downlink carriers with the highest priority CSI reporting type, one of the plurality of carriers with the lowest carrier index is selected according to indexes of the carriers; or to select a downlink carrier with the lowest carrier index directly according to carrier indexes; or to determine a set of downlink carriers, for each of which the maximum number of feedback bits corresponding to the CSI reporting type does not exceed $(A-B_{min})$ bits, among downlink carriers with CSI feedback in the current subframe, and to select a downlink carrier with a highest priority CSI reporting type in the set of downlink carriers according to CSI reporting type priorities, wherein when there are a plurality of downlink carriers with the highest priority CSI reporting type in the set of downlink carriers, one of the plurality of carriers with the lowest carrier index is selected according to indexes of the carriers; or to determine a set of downlink carriers, for each of which the maximum number of feedback bits corresponding to the CSI reporting type does not exceed $(A-B_{min})$ bits, among downlink carriers with CSI feedback in the current subframe, and to select a downlink carrier with the lowest carrier index in the set of downlink carriers directly according to carrier indexes; or to determine a set of downlink carriers, for each of which the number of real feedback bits of the CSI reporting type does not exceed $(A-B_{min})$ bits, among downlink carriers with CSI feedback in the current subframe, and to select a downlink carrier with a highest priority CSI reporting type in the set of downlink carriers according to CSI reporting type priorities, where when there are a plurality of downlink carriers with the highest priority CSI reporting type in the set of downlink carriers, one of the plurality of carriers with the lowest carrier index is selected according to indexes of the carriers; or to determine a set of downlink carriers, for each of which the number of real feedback bits of the CSI reporting type does not exceed $(A-B_{min})$ bits, among downlink carriers with CSI feedback in the current subframe, and to select a downlink carrier with the lowest carrier index in the set of downlink carriers directly according to carrier indexes;

and/or when the judging module determines the set of downlink carriers, for each of which the maximum number of feedback bits corresponding to the CSI reporting type does not exceed $(A-B_{min})$ bits, among downlink carriers with CSI feedback in the current subframe, or when the judging module determines the set of downlink carriers, for each of which the number of real feedback bits of the CSI reporting type does not exceed $(A-B_{min})$ bits, among downlink carriers with CSI feedback in the current subframe, the judging module is configured:

to judge $C>A-B_{min}$ directly if the set of downlink carriers determined by the base station is a null set;

and/or wherein the current subframe is a sub-frame in which a Scheduling Request, SR, is transmitted, the processing module is configured:

to receive the ACK/NACK feedback information and a 1-bit SR transmitted by the user equipment, or the ACK/NACK feedback information, the CSI feedback information and a 1-bit SR transmitted by the user equipment concurrently, or the spatially-bundled ACK/NACK feedback information, the CSI feedback information and a 1-bit SR transmitted by the user equipment concurrently, on the corresponding channel resource in the current subframe;

and/or the determining module is configured to determine the threshold number A of bits as predefined or to determine and configure the user equipment with the threshold number A of bits via high-layer signaling or Physical Downlink Control Channel, PDCCH, signaling, wherein the value of A is any positive integer that does not exceed a maximum number of carrying bits in an uplink transmission scheme for transmitting ACK/NACK feedback information and CSI feedback information concurrently in the current subframe or any positive integer that does not exceed a difference between the maximum number of carrying bits in the uplink transmission scheme and a number of SR bits.

\* \* \* \* \*